(12) United States Patent
Tonami et al.

(10) Patent No.: US 7,671,552 B2
(45) Date of Patent: Mar. 2, 2010

(54) CONTROL DEVICE

(75) Inventors: Yosuke Tonami, Tokyo (JP); Mimpei Morishita, Tokyo (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 66 days.

(21) Appl. No.: 11/817,421

(22) PCT Filed: Mar. 28, 2006

(86) PCT No.: PCT/JP2006/306210

§ 371 (c)(1),
(2), (4) Date: Aug. 30, 2007

(87) PCT Pub. No.: WO2006/106642

PCT Pub. Date: Oct. 12, 2006

(65) Prior Publication Data

US 2009/0021194 A1 Jan. 22, 2009

(30) Foreign Application Priority Data

Mar. 31, 2005 (JP) .............................. 2005-104447

(51) Int. Cl.
H02P 21/00 (2006.01)
(52) U.S. Cl. .................................. 318/400.02; 318/432
(58) Field of Classification Search ............ 318/400.02, 318/727, 800, 432, 434
See application file for complete search history.

(56) References Cited

U.S. PATENT DOCUMENTS

| 4,677,361 | A | * | 6/1987 | Yonemoto | ................... 318/805 |
|---|---|---|---|---|---|
| 5,631,819 | A | * | 5/1997 | Masaki et al. | ............... 363/132 |
| 5,777,447 | A | * | 7/1998 | Okano | ........................ 318/434 |
| 5,796,228 | A | * | 8/1998 | Kojima et al. | ............... 318/605 |
| 6,329,781 | B1 | * | 12/2001 | Matsui et al. | ............... 318/717 |
| 2004/0201358 | A1 | * | 10/2004 | Kawaji et al. | ............... 318/701 |

FOREIGN PATENT DOCUMENTS

| JP | 3-7081 A | 1/1991 |
|---|---|---|
| JP | 7-129251 A | 5/1995 |
| JP | 11-299277 A | 10/1999 |
| JP | 2001-31339 A | 2/2001 |
| JP | 2003-259680 A | 9/2003 |
| JP | 2004-23804 A | 1/2004 |
| JP | 2004-215399 A | 7/2004 |
| JP | 2005-57935 A | 3/2005 |

* cited by examiner

Primary Examiner—Rina I Duda
(74) Attorney, Agent, or Firm—Foley & Lardner LLP

(57) ABSTRACT

A control device sets parameters "n", "ad", "pd", "aq", "pq" and the like of a motor parameter setting unit, corrects a d-axis current command value outputted from a d-axis current instructing unit and a q-axis current command value outputted from q-axis current instructing unit based on these parameters of the motor parameter setting unit, on a detection result of a rotation angle detection unit, and makes a (6×n)f sine component, (6×n)f cosine component, (6×(n+1))f sine component, and (6×(n+1))f cosine component of torque to zero. In such a way, 6×n and 6×(n+1) ripple components and the like, which are generated in a motor provided in elevator equipment or the like, are suppressed, and a torque ripple of the motor is reduced to a large extent.

6 Claims, 13 Drawing Sheets

CONTROL DEVICE

TECHNICAL FIELD

The present invention relates to a control device that controls a motor for use in elevator equipment.

BACKGROUND ART

In general, a permanent magnet synchronous motor can be fabricated to be more compact than an induction motor with respect to the same output, and accordingly, has been going to be used for drive units of a variety of systems in recent years.

Incidentally, in the permanent magnet synchronous motor, a change of an armature magnetic flux that rotates a magnetic pole is not a sine wave of a rotation angle, but contains a distortion. Therefore, torque generated by the motor pulsates since such a magnetic flux change that should originally have a sine wave shape contains the distortion, and this causes an uneven rotation and the like. Moreover, unbalance of a coil of the motor, an error in a sensor system that detects a current, and the like also cause such a torque ripple.

As a reduction method of the torque ripple, there is a method as disclosed in "Patent Document 1", in which, since the torque ripple has association with the rotation of the motor, this association is stored in a storage device, data on the torque ripple, which corresponds to the association, is read out based on the rotation angle of the motor, and one obtained by subtracting an amount of the ripple from a torque command value is set as a new torque command value. Moreover, there is a method as disclosed in "Patent Document 2", in which a torque ripple correction signal "Tcomp=A×sin(n×θ+p)" is arithmetically operated from such a motor rotation angle "θ", an adjustment gain "A", and an adjustment phase "p", the torque ripple correction signal thus obtained is added to a target torque command in a feed-forward manner in synchronization with a rotation cycle of the motor, and the torque ripple is cancelled.

[Patent Document 1] Japanese Patent Laid-Open Publication No. H11-299277

[Patent Document 2] Japanese Patent Laid-Open Publication No. H7-129251

DISCLOSURE OF THE INVENTION

As one of control devices which control the motor for use in elevator equipment, a device shown in FIG. 1 has been previously proposed.

In a control device 101 shown in this diagram, a motor 112 is a driven by driving unit 108 such as an inverter. A rotation angle of the motor 112 is detected by a rotation angle detecting unit 111 such as a pulse generator PG, and the detected rotation angle is inputted to a speed control system (portion composed of a d-axis current instructing unit 102, a q-axis current instructing unit 103, and a q-axis current command value correcting unit 105) 113 that controls a speed of the motor 112.

In the speed control system 113, a current command value to a current controlling unit 106 for outputting a drive signal to the driving unit 108 is arithmetically operated from a speed deviation signal between an actual speed of the motor 112 and a speed command value thereto.

In the case of vector-controlling the motor 112, this current command value is a d-axis current command value "Idc" and a q-axis current command value "Iqc" in an orthogonal rotation coordinate system. The d-axis current command value "Idc" is a magnetic flux current command value that generates a magnetic flux in the motor 112, and the q-axis current command value "Iqc" is a torque current command value that generates torque in the motor 112.

In the current controlling unit 106 and 2-phase/3-phase converting unit 107, the d-axis current command value "Idc", the q-axis current command value "Iqc", an electrical angle (rotation angle) "θe" in the rotation angle detecting unit 111, and current signals "Idf" and "Iqf" outputted from a 3-phase/2-phase converting unit 110 are captured, and such voltage command values "Vu", "Vv" and "Vw" in which "Iuf" and "Iwf" outputted from a current detecting unit 109 satisfy the d-axis current command value "Idc", the q-axis current command value "Iqc" and the electrical angle "θe" are created, and are outputted to the driving unit 108.

Specifically, by the current detecting unit 109, current values of drive currents of three phases, which are supplied to the motor 112, are individually detected, and output current signals "Iuf", "Ivf" and "Iwf" are outputted, and are inputted to the 3-phase/2-phase converting unit 110. As represented in the following expressions, this 3-phase/2-phase converting unit 111 converts the output current signals "Iuf", "Ivf" and "Iwf" expressed as three phases in a coordinate system at rest, which are outputted from the current detecting unit 109, into "Iα" and "Iβ" expressed as two phases in an orthogonal coordinate system at rest. These converted current signals "Iα" and "Iβ" of two phases are converted into current signals "Idf" and "Iqf" in the orthogonal rotation coordinate system. Specifically, based on the electrical angle "θe", the current signals "Iα" and "Iβ" in the orthogonal coordinate system at rest are converted into the current signals "Idf" and "Iqf" in the orthogonal rotation coordinate system, and are outputted to the current controlling unit 106.

$$I_{vf} = -I_{uf} - I_{wf} \qquad \text{[Expression 1]}$$

$$\begin{pmatrix} I_\alpha \\ I_\beta \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} I_{uf} \\ I_{vf} \\ I_{wf} \end{pmatrix} \qquad \text{[Expression 2]}$$

$$\begin{pmatrix} I_{df} \\ I_{qf} \end{pmatrix} = \begin{pmatrix} \cos(\theta_c) & \sin(\theta_c) \\ -\sin(\theta_c) & \cos(\theta_c) \end{pmatrix} \begin{pmatrix} I_\alpha \\ I_\beta \end{pmatrix} \qquad \text{[Expression 3]}$$

Here, a suffix "d" denotes a d-axis component, and a suffix "q" denotes a q-axis component.

Moreover, deviations among a d-axis current command "Idco" outputted from the current command value correcting unit 102f a q-axis current command "Iqco" outputted from the q-axis current command value correcting unit 105, and the current signals "Idf" and "Iqf" outputted from the 3-phase/2-phase converting unit 110 are individually inputted to a PI controller and the like which compose the current controlling unit 106, and are subjected to a PI arithmetic operation (proportional-plus-integral arithmetic operation). Then, as represented in the following expression, the PI controller and the like output a d-axis voltage command "Vdc" and a q-axis voltage command "Vqc" in the orthogonal rotation coordinate system are outputted.

$$\begin{pmatrix} V_{dc} \\ V_{qc} \end{pmatrix} = \begin{pmatrix} Kp_d + \frac{Ki_d}{s} & 0 \\ 0 & Kp_q + \frac{Ki_q}{s} \end{pmatrix} \begin{pmatrix} I_{dc} - I_{df} \\ I_{qc} - I_{qf} \end{pmatrix} \qquad \text{[Expression 4]}$$

Here, "Kp" is a proportional gain, "Ki" is an integral gain, and "s" is a Laplace operator.

The d-axis voltage command "Vdc" and the q-axis voltage command "Vqc" from the PI controller and the like are inputted to the 2-phase/3-phase converting unit 107. In the 2-phase/3-phase converting unit 107, as represented in the following expression, the d-axis voltage command "Vdc" and the q-axis voltage command "Vqc" are converted into voltage command values "Vα" and "Vβ" in the orthogonal coordinate system at rest. Specifically, based on the electrical angle "θe", the voltage command values "Vdc" and "Vqc" in the orthogonal rotation coordinate system are converted into the voltage command values "Vα" and "Vβ" in the orthogonal coordinate system at rest. The converted voltage command values "Vα" and "Vβ" in the orthogonal coordinate system at rest, which are expressed as two phases, are converted into the voltage command values "Vu", "Vv" and "Vw" in the orthogonal coordinate system at rest, which are expressed as three phases. Then, the voltage command values "Vu", "Vv" and "Vw" are outputted to the driving unit 108.

$$\begin{pmatrix} V_\alpha \\ V_\beta \end{pmatrix} = \begin{pmatrix} \cos(\theta_c) & -\sin(\theta_c) \\ \sin(\theta_c) & \cos(\theta_c) \end{pmatrix} \begin{pmatrix} V_{dc} \\ V_{qc} \end{pmatrix}$$ [Expression 5]

$$\begin{pmatrix} V_u \\ V_v \\ V_w \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V_\alpha \\ V_\beta \end{pmatrix}$$ [Expression 6]

In the permanent magnet synchronous motor, the magnetic flux change that should originally have the sine wave shape contains the distortion. Accordingly, the generated torque of the motor pulsates, causing the uneven rotation and the like. Moreover, the unbalance of the coil of the motor, the error in the sensor system that detects the current, and the like also cause the torque ripple.

Moreover, it is ideally desirable that a spatial distribution of the magnetic flux generated by an armature coil current have the sine wave shape. However, harmonics are superimposed on the since wave, and this becomes a cause to distort the generated torque.

Lower components of such harmonic components are five times/seven times a frequency to a fundamental wave, and such fifth/seventh components of the magnetic flux become a cause of a torque ripple of a six-time component (6f component) of the fundamental frequency.

In a similar way, 11 times/13 times components of the magnetic flux, which are as represented by the following expression, become a cause of a torque ripple of a 12f component.

$$E_u(\theta_c) = -\omega \times Ke \times \begin{pmatrix} \sin(\theta_c) + k5 \times \sin(5 \times \theta_c) + \\ k7 \times \sin(7 \times \theta_c) + \ldots \end{pmatrix}$$ [Expression 7]

$$E_v(\theta_c) = E_0\left(\theta_c - \frac{2\pi}{3}\right)$$ [Expression 8]

$$E_w(\theta_c) = E_v\left(\theta_c - \frac{2\pi}{3}\right) = E_u\left(\theta_c - \frac{4\pi}{3}\right)$$ [Expression 9]

$$\omega = \frac{d\theta_c}{dt}$$ [Expression 10]

Here, "Eu", "Ev" and "Ew" are induction voltages (hereinafter, for simplicity, a winding-number notation of the electrical angle "θe" will be omitted according to needs) induced to armature coils of the respective phases, "ω" is a rotation speed (time derivative of the rotation angle), and "Ke" is a constant of counter-electromotive force.

When the 3-phase induction voltages "Eu", "Ev" and "Ew" in the above expression are subjected to the 3-phase/2-phase conversion, the following expressions are established.

$$\begin{pmatrix} E_\alpha \\ E_\beta \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} E_u \\ E_v \\ E_w \end{pmatrix}$$ [Expression 11]

$$\begin{pmatrix} E_d \\ E_q \end{pmatrix} = \begin{pmatrix} \cos(\theta_c) & \sin(\theta_c) \\ -\sin(\theta_c) & \cos(\theta_c) \end{pmatrix} \begin{pmatrix} E_\alpha \\ E_\beta \end{pmatrix}$$ [Expression 12]

Moreover, when the motor 112 is a cylindrical motor, torque T is obtained in the following expression from the induction voltages "Eu", "Ev" and "Ew" and the respective currents "Iu", "Iv" and "Iw".

$$T \approx \frac{E_u \times I_u + E_v \times I_v + E_w \times I_w}{\omega}$$ [Expression 13]

$$\approx \frac{E_d \times I_d + E_q \times I_q}{\omega}$$

Measures such as skew are taken for the motor 112, and also in such a way, the torque ripple can be suppressed to a level free from a problem; however, this will bring a const increase.

Moreover, as reduction methods of the torque ripple, there are methods described in "Patent Document 1" and "Patent Document 2".

However, the conventional reduction methods of the torque ripple are ones to correct a torque command value (torque current command value), and there has been a problem that a (6×(n+1))f component becomes large when a torque ripple of a (6×n)f component is tried to be cancelled.

For simplicity, a description will be made of the case where there is only a fifth component of the magnetic flux.

The induction voltages "Eu", "Ev" and "Ew" of the respective phases, for example, the induction voltage "Eu" becomes as in the following expression. Moreover, the other respective induction voltages "Ev" and "Ew" are also represented in similar expressions.

$$E_u(\theta_e) = -\omega \times Ke \times (\sin(\theta_e) + k5 \times \sin(5 \times \theta_e))$$ [Expression 14]

When the torque "T" is obtained by substituting the above expression into [Expression 13], the following expression is established, and it is understood that the 6f torque ripple is present.

$$T = \sqrt{\frac{3}{2}} \times Ke \times \begin{pmatrix} I_{qco} - k5 \times I_{qco} \times \cos(6 \times \theta_c) - \\ k5 \times I_{dco} \times \sin(6 \times \theta_c) \end{pmatrix}$$ [Expression 15]

Meanwhile, the d-axis current command value "Idc" and the q-axis current command value "Iqc" in the case of using the publicly known torque ripple correction signal "Tcomp" become as in the following expressions.

$$dI_{qc} = A \times \sin(6 \times \theta_c + p) \quad \text{[Expression 16]}$$

$$\begin{pmatrix} I_{dc} \\ I_{qc} \end{pmatrix} = \begin{pmatrix} I_{dco} \\ I_{qco} \end{pmatrix} + \begin{pmatrix} 0 \\ dI_{qc} \end{pmatrix} \quad \text{[Expression 17]}$$

In a similar way to [Expression 15], the torque "T" in the case of the above expressions become as in the following expression.

$$T = \sqrt{\frac{3}{2}} \times Ke \times \left( I_{qco} - k5 \times \frac{A \times \sin(p)}{2} \right) - \quad \text{[Expression 18]}$$

$$\sqrt{\frac{3}{2}} \times Ke \times (k5 \times I_{qco} \times \cos(6 \times \theta_c) +$$

$$k5 \times I_{dco} \times \sin(6 \times \theta_c) - A \times \sin(6 \times \theta_c + p)) -$$

$$\sqrt{\frac{3}{2}} \times Ke \times k5 \times \frac{A \times \sin(12 \times \theta_c + p)}{2}$$

As understood from this [Expression 18], while the 6f Component of the torque ripple is generated by the fifth component of the magnetic flux, a 12f component is newly generated when the 6f component is tried to be cancelled by the conventional reduction methods.

Moreover, it is frequent that the torque ripple depends on operation conditions of the motor 112. There has also been a problem that performance for reducing the torque ripple is deteriorated when the operation conditions are changed, for example, in such a case where the motor 112 accelerates and decelerates.

Moreover, the motor 112 has had a problem of vibrations/noise owing to a ripple of electromagnetic suction force in a radius direction.

In consideration for the above-described circumstances, it is an object of the present invention to provide a control device capable of reducing a torque ripple of a motor to a large extent by adjusting a waveform of an output current supplied to the motor.

Moreover, it is another object of the present invention to provide a control device, while reducing force variations in a Z-direction, which are generated in a liner motor, by adjusting a waveform of an output current supplied to the linear motor, capable of automatically correcting a parameter by detecting vibrations or noise of the linear motor, and capable of reducing the vibrations/noise of the linear motor.

In order to achieve the above-described object, from a first aspect, the present invention provides a control device, comprising: a d-axis/q-axis current instructing unit for creating a d-axis current command and a q-axis current command in response to a deviation between an actually measured speed and preset rotation speed of a motor; a rotation angle detecting unit for detecting a rotation of the motor and outputting an electrical angle; a motor parameter setting unit in which parameters corresponding to characteristics of the motor are set; a current command value correcting unit for performing a correction necessary to suppress a harmonic ripple component of torque generated by the motor for the d-axis current command and the q-axis current command, which are outputted from the d-axis/q-axis current instructing unit, in response to the electrical angle outputted from the rotation angle detecting unit and to the parameters outputted from the motor parameter setting unit, and a creating already corrected d-axis current command value and q-axis current command value; and a 3-phase driving unit for creating drive voltages of three phases and supplying the drive voltages to the motor based on the already corrected d-axis current command value and q-axis current command value, which are outputted from the current command value correcting unit, and on an output current detection signal of the motor, which is outputted from the current detecting unit.

Moreover, from a second aspect, the present invention provides a control device, comprising: a d-axis/q-axis current instructing unit for creating a d-axis current command and a q-axis current command in response to a deviation between an actually measured speed and preset rotation speed of a linear motor; an electrical angle detecting unit for detecting the speed of the linear motor and outputting an electrical angle; a motor parameter setting unit in which parameters corresponding to characteristics of the linear motor are set; a current command value correcting unit for performing a correction necessary to suppress a harmonic ripple component in a Z-direction, which is generated by the linear motor, for the d-axis current command and the q-axis current command, which are outputted from the d-axis/q-axis current instructing unit, in response to the electrical angle outputted from the electrical angle detecting unit and to the parameters outputted from the motor parameter setting unit, and creating already corrected d-axis current command value and q-axis current command value; 3-phase driving unit for creating drive voltages of three phases and supplying the drive voltages to the linear motor based on the already corrected d-axis current command value and q-axis current command value, which are outputted from the current command value correcting unit, and on an output current detection signal of the linear motor, which is outputted from a current detecting unit; a ripple detecting unit for detecting vibrations or noise of the linear motor; and a correction parameter learning unit for obtaining a parameter necessary to minimize the vibrations or noise of the linear motor based on an output of the ripple detecting unit and on the already corrected d-axis current command value and q-axis current command value, which are created by the current command value correcting unit, and performing either processing for correcting the parameters for use in the current command value correcting unit or processing for notifying the obtained parameter from a notification device.

According to the present invention, the waveform of the output current supplied to the motor can be adjusted, and the torque ripple of the motor can be reduced to a large extent. As a result, the vibrations/noise of the motor can be reduced.

Moreover, the waveform of the output current supplied to the linear motor can be adjusted, and the force variations in the Z-direction, which are generated in the linear motor, can be reduced to a large extent. As a result, the vibrations/noise of the linear motor can be reduced.

BEST MODE FOR CARRYING OUT THE INVENTION

FIRST EMBODIMENT

Figure 1:
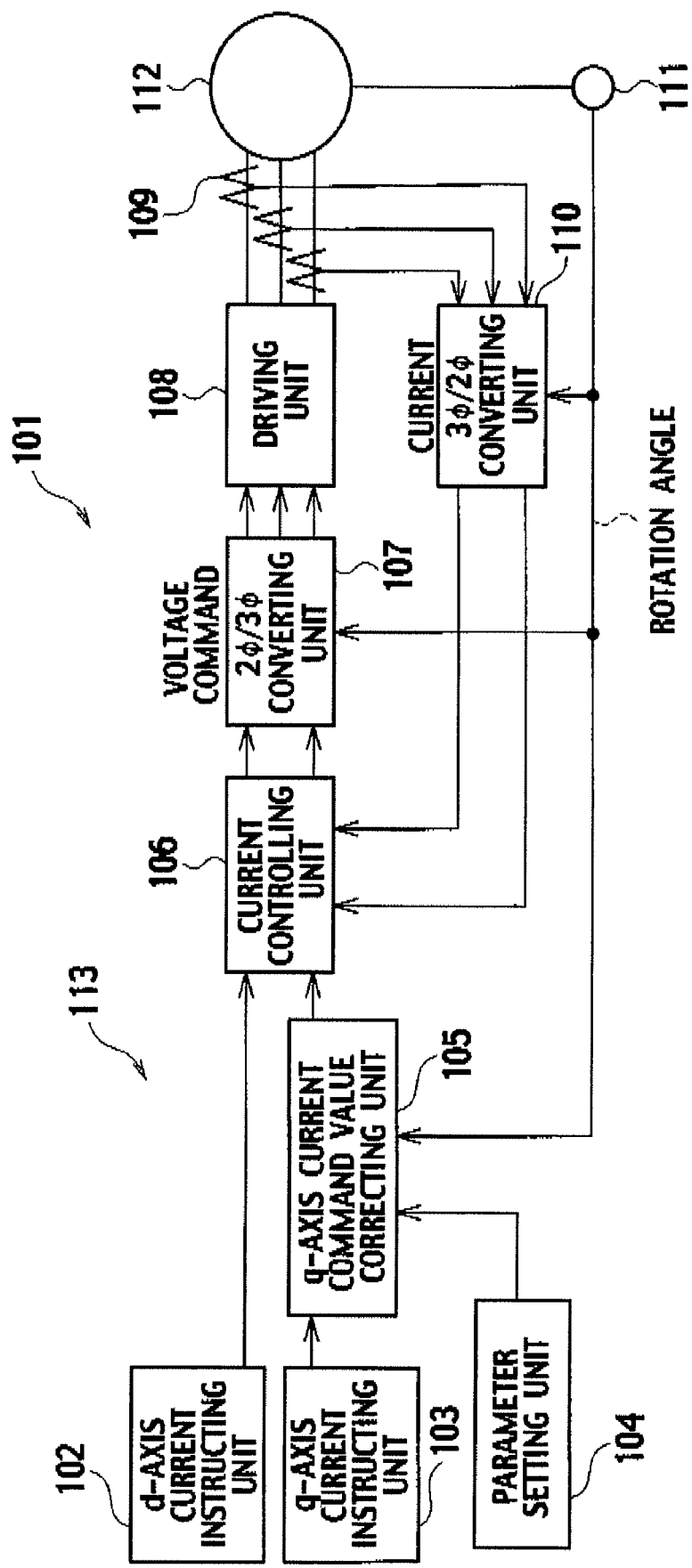
FIG. 1 is a block diagram showing an example of a previously proposed control device.
Figure 2:
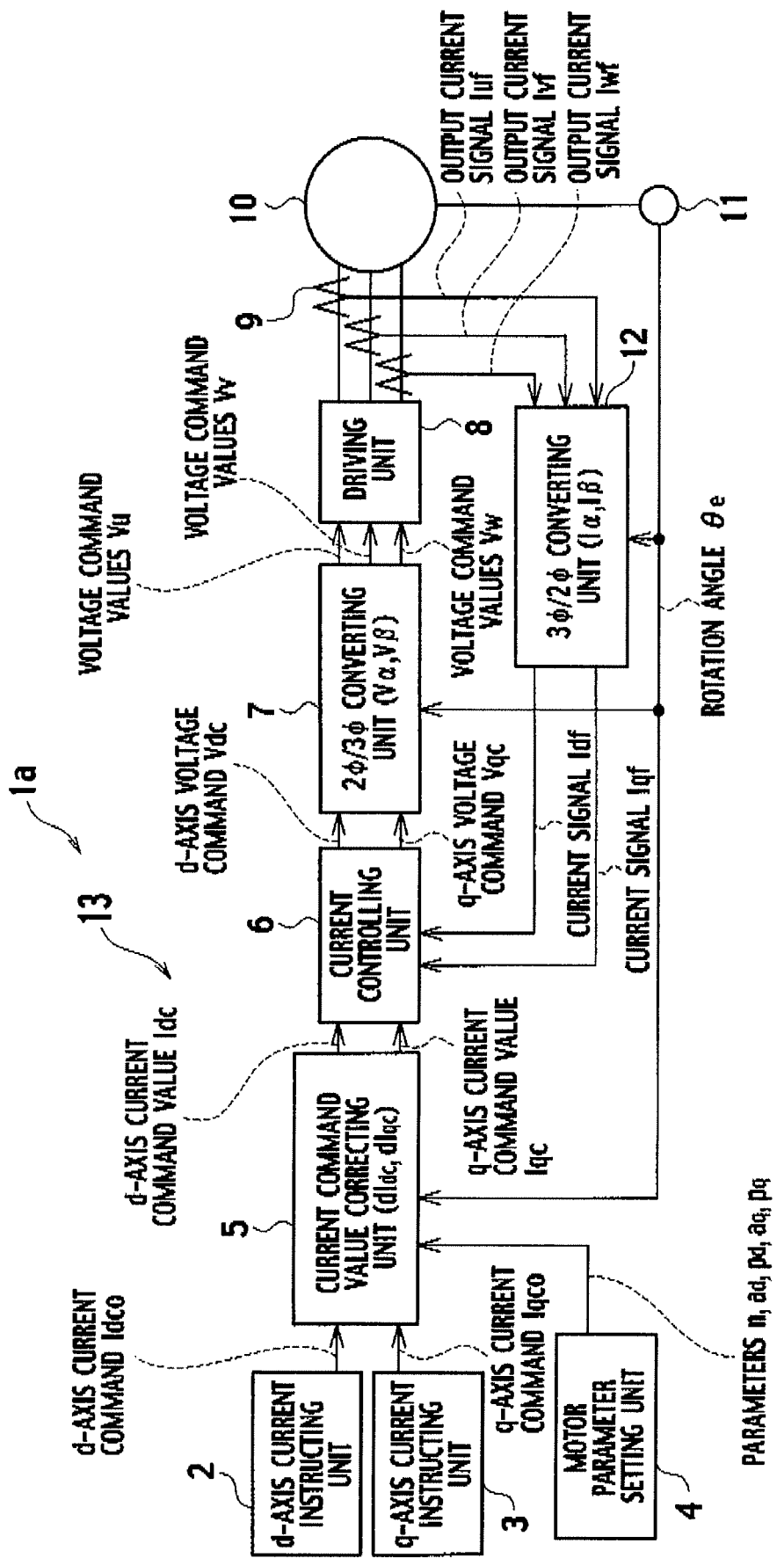
FIG. 2 is a block diagram showing a first embodiment of a control device according to the present invention.

FIG. 2 is a block diagram showing a first embodiment of a control device according to the present invention.

A control device 1a shown in this drawing includes: a d-axis current instructing unit 2 that outputs a d-axis current command "Idco"; a q-axis current instructing unit 3 that outputs a q-axis current command "Iqco"; and a motor parameter setting unit 4 in which parameters "n", "ad", "pd", "aq", "pq" and the like of a motor 10 are set.

Moreover, this control device 1a includes: a current command correcting unit 5; a current controlling unit 6; a 2-phase/3-phase converting unit 7; a driving unit 8; a current detecting unit 9; a rotation angle detecting unit 11 that detects a rotation angle "θe" of the motor 10, and a 3-phase/2-phase converting unit 12.

Here, based on the parameters "n", "ad", "pd", "aq", and "pq" of the motor 10, which are outputted from the motor parameter setting unit 4, and on a detection result of the rotation angle detecting unit 11, the current command correcting unit 5 corrects the d-axis current command "Idco" outputted from the d-axis current instructing unit 2, and the q-axis current command "Iqco" outputted from the q-axis current instructing unit 3, and outputs a d-axis current command value "Idc" and a q-axis current command value "Iqc".

Moreover, based on the d-axis current command value "Idc" and the a q-axis current command value "Iqc", which are outputted from the current command correcting unit 5, and on current signals "Idf" and "Iqf" outputted from the 3-phase/2-phase converting unit 12, the current controlling unit 6 arithmetically operates a d-axis voltage command "Vdc" and a q-axis voltage command "Vqc".

Furthermore, based on the d-axis voltage command "Vdc" and the q-axis voltage command "Vqc", which are outputted from the current controlling unit 6, and on the rotation angle "θe" outputted from the rotation angle detecting unit 11, the 2-phase/3-phase converting unit 7 arithmetically operates voltage command values "Vu", "Vv" and "Vw" of three phases.

Moreover, based on the voltage command values "Vu", "Vv" and "Vw" outputted from the 2-phase/3-phase converting unit 7, the driving unit 8 outputs drive voltages of three phases, and drives the motor 10.

The current detecting unit 9 detects outputs currents of three phases, which are supplied to the motor 10, and outputs output current signals "Iuf", "Ivf", and "Iwf".

Based on the output current signals "Iuf", "Ivf", and "Iwf" outputted from the current detecting unit 9, and on the rotation angle "θe" outputted from the rotation angle detecting unit 11, the 3-phase/2-phase converting unit 12 arithmetically operates the current signals "Idf" and "Iqf".

Next, a description will be made of an entire operation of the control device 1a with reference to FIG. 2.

A rotation angle of the motor 10 is detected in a pulse form by the rotation angle detecting unit 11 composed of a PG and the like, and is converted into the electrical angle (rotation angle) "θe" corresponding to the detection. Then, the rotation angle is inputted to a speed control system (portion composed of the d-axis current instructing unit 2, the q-axis current instructing unit 3, and the current command value correcting unit 5) 13 that controls a speed of the motor 10.

In the speed control system 13, an actual speed of the motor 10 is calculated by the electrical angle "θe" inputted from the rotation angle detecting unit 11, and from a speed deviation signal between the actual speed and a speed command value to the motor 10, the d-axis current command value "Idc" and the q-axis current command value "Iqc" to the current controlling unit 6 are arithmetically operated, and are outputted to the current controlling unit 6.

As represented in the following expression, these d-axis current command value "Idc" and q-axis current command value "Iqc" are a d-axis current command value (magnetic flux current command value) "Idc" and a q-axis current command value (torque current command value) "Iqc" in an orthogonal rotation coordinate system in the case of vector-controlling the motor 10.

$$\begin{pmatrix} I_{dc} \\ I_{qc} \end{pmatrix} = \begin{pmatrix} I_{dco} \\ I_{qco} \end{pmatrix} + \begin{pmatrix} dI_{dc} \\ dI_{qc} \end{pmatrix} \quad \text{[Expression 19]}$$

Here, "Idco" "Iqco" are the d-axis current command value outputted from the d-axis current instructing unit 2, and the q-axis current command value outputted from the q-axis current instructing unit 3, respectively. Moreover, "dIdc" and "dIqc" are the parameters "n", "ad", "pd", "aq", "pq" set in the motor parameter setting unit 4.

Moreover, in the current command value correcting unit 5, based on the parameters "n", "ad", "pd", "aq", "pq" outputted from the motor parameter setting unit 4, and on the electrical angle outputted from the rotation angle detecting unit 11, and on the like, a d-axis current command correction signal "dIdco" and a q-axis current command correction signal "dIqco", which are necessary to cancel the torque ripple generated in the motor 10, are created. Then, the d-axis current command "Idco" outputted from the d-axis current instructing unit 2 and the q-axis current command "Iqco" outputted from the q-axis current instructing unit 3 are corrected, and the d-axis current command value "Idc" and the q-axis current command value "Iqc" are created, and are outputted to the current controlling unit 6.

In the current controlling unit 6 and the 2-phase/3-phase converting unit 7, the d-axis current command value "Idc" and the q-axis current command value "Iqc" in the orthogonal rotation coordinate system, and the current signals "Idf" and "Iqf" in the orthogonal rotation coordinate system, which are outputted from the 3-phase/2-phase converting unit 12, are inputted thereto, and the voltage command values "Vu", "Vv" and "Vw" necessary to allow the output current signals "Iuf"

and "Iwf" outputted from the current detecting unit 9 to correspond to the d-axis current command value "Idc", the q-axis current command value "Iqc", and the electrical angle "θe" are arithmetically operated, and are outputted to the driving unit 8.

Specifically, the output current signals "Iuf" and "Iwf" are detected by the current detecting unit 9, and are inputted to the 3-phase/2-phase converting unit 12. This 3-phase/2-phase converting unit 12 converts the current signals "Iuf" and "Iwf" from the current detecting unit 9, which are expressed as three phases in the orthogonal coordinate system at rest, into current signals "Iα" and "Iβ" expressed as two phases in the orthogonal coordinate system at rest. The 2-phase current signals "Iα" and "Iβ" thus converted are converted into the current signals "Idf" and "Iqf" in the orthogonal rotation coordinate system based on the electrical angle "θe", and are outputted to the current controlling unit 6.

Then, deviations among the d-axis current command value "Idc", the q-axis current command value "Iqc", and the current signals "Idf" and "Iqf" are individually subjected to a PI arithmetic operation (proportional-plus-integration arithmetic operation) by a PI controller and the like which compose the current controlling unit 6, and then the d-axis voltage command "Vdc" and the q-axis voltage command "Vqc" in the orthogonal rotation coordinate system are created.

These d-axis voltage command "Vdc" and q-axis voltage command "Vqc" from the PI controller are inputted to the 2-phase/3-phase converting unit 7. In the 2-phase/3-phase converting unit 7, the d-axis voltage command "Vdc" and the q-axis voltage command "Vqc" are converted into voltage command values "Vα" and "Vβ" in the orthogonal rotation coordinate system. Specifically, based on the electrical angle "θe", the d-axis voltage command "Vdc" and the q-axis voltage command "Vqc" in the orthogonal rotation coordinate system are converted into the voltage command values "Vα" and "Vβ" in the orthogonal coordinate system at rest. The voltage command values "Vα" and "Vβ" in the orthogonal coordinate system at rest, which are expressed as two phases, are converted into the voltage command values "Vu", "Vv" and "Vw" in the orthogonal coordinate system at rest, which are expressed as three phases, and are outputted to the driving unit 8.

In the driving unit 8, the 3-phase output voltages are created by using the voltage command values "Vu", "Vv" and "Vw" from the 2-phase/3-phase converting unit 7, and the motor 10 is driven.

Next, a description will be made of a detailed operation of the current command correcting unit 5 with reference to FIG. 3.

Figure 3:
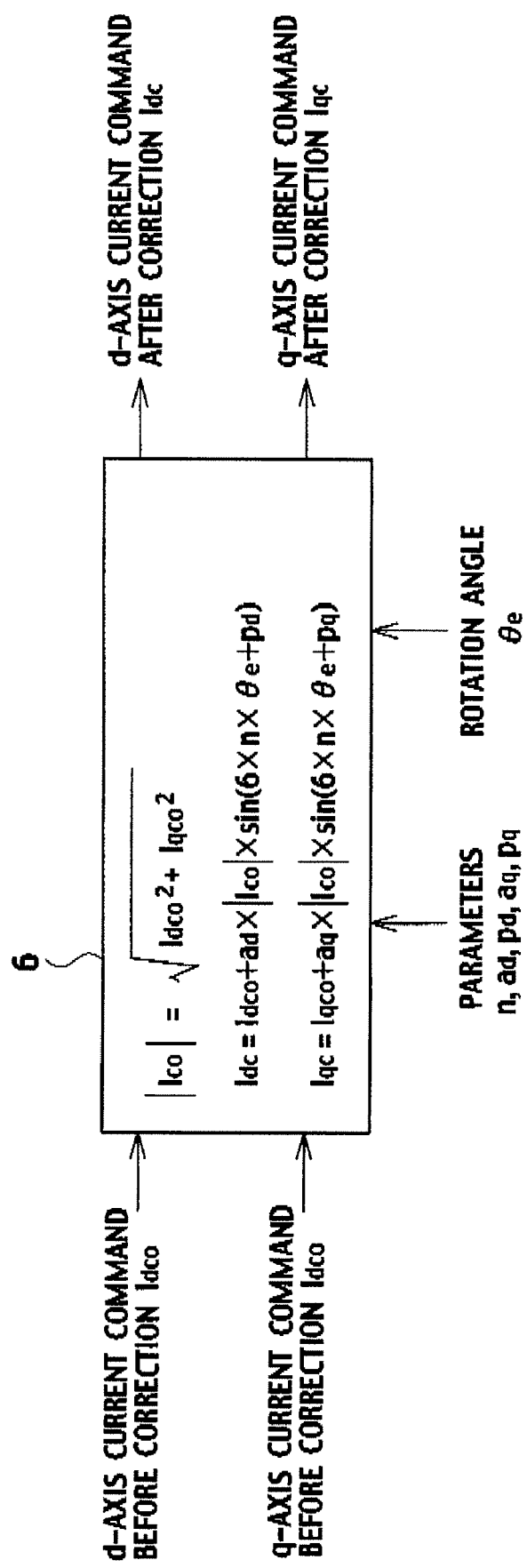
FIG. 3 is an explanatory view showing a detailed operation example of a current command value correcting unit shown in FIG. 2.

In the current command correcting unit 5, as shown in FIG. 3, a phase 6×n times the electrical angle "θe" is arithmetically operated, and the obtained phase "6×n×" θe of the current command value and the adjustment phases "pd" and "pq" which adjust the phase of the sine wave are added together, and phases "Pd" and "Pq" of the sine wave are obtained.

Moreover, as represented in the following expression, an absolute value "|Ico|" of a voltage command corresponding to the d-axis current command "Idco" outputted from the d-axis current instructing unit 2 and to the q-axis current command "Iqco", outputted from the q-axis current instructing unit 3 is arithmetically operated. Then, the obtained absolute value "|Ico|" of the current command value, a (6×n±1)f harmonic component ratio "n" of the magnetic flux obtained from the motor parameter setting unit 4, and adjustment amplitudes "ad" and "aq" which adjust an amplitude of the sine wave are multiplied with one another, and amplitude values "Ad" and "Aq" are obtained.

Then, for the sine wave in which the amplitude values are set as "Ad" and "Aq" and the phases are set as "Pd" and "Pq", the current command correction signals "dIdc" and "dIqc" which are represented as below are arithmetically operated.

$$\begin{pmatrix} dI_{dc} \\ dI_{qc} \end{pmatrix} = \begin{pmatrix} A_d \times \sin(P_d) \\ A_q \times \sin(P_q) \end{pmatrix} = \begin{pmatrix} a_d \times |I_{co}| \times \sin(6 \times n \times \theta_c + P_d) \\ a_q \times |I_{co}| \times \sin(6 \times n \times \theta_c + p_q) \end{pmatrix}$$ [Expression 20]

$$|I_{co}| = \sqrt{I_{qco}^2 + I_{dco}^2}$$ [Expression 21]

Here, a suffix "d" denotes ad-axis component, and a suffix "q" denotes a q-axis component.

Then, in response to the current command correction signals "dIdc" and "dIqc", the torque "T" of the motor 10 becomes the sum of constant terms, (6×n)f sine component, (6×n)f cosine component, (6×(n+1))f sine component, and (6×(n+1))f cosine component of the rotation angle, which is as represented in the following expression.

$$T = \frac{\partial W}{\partial \theta_o}$$ [Expression 22]

$$= T_o(a_d, p_d, a_q, p_q) + T_{6DS}(a_d, p_d, a_q, p_q) \times \sin(6 \times n \times \theta_c) +$$
$$T_{6nc}(a_d, p_d, a_q, p_q) \times \cos(6 \times n \times \theta_c) + T_{6(n+1)c}(a_d, p_d, a_q, p_q) \times$$
$$\sin(6 \times (n+1) \times \theta_c) + T_{6(n+1)c}(a_d, p_d, a_q, p_q) \times \cos(6 \times (n+1) \times \theta_c)$$

Here, "W" is magnetic energy in an inside of the motor 10, a suffix "s" denotes the sine component, and a suffix "c" denotes a cosine component. Note that the respective components "T0" to "T6(n+1)c" become functions of the parameters "n", "ad", "pd", "aq", "pq", and the like, which are set by the motor parameter setting unit 4.

Based on the above expression, initial values of the adjustment amplitudes "ad" and "aq" and the adjustment phases "pd" and "pq" are obtained so as to satisfy the following expression, that is, so that the (6×n)f component and the (6×(n+1)f component can become zero.

$$\begin{pmatrix} T_{6ns}(a_d, P_d, a_q, p_q) \\ T_{6nc}(a_d, p_d, a_q, p_q) \\ T_{6(n+1)s}(a_d, p_d, a_q, p_q) \\ T_{6(n+1)c}(a_d, p_d, a_q, p_q) \end{pmatrix} = \begin{pmatrix} 0 \\ 0 \\ 0 \\ 0 \end{pmatrix}$$ [Expression 23]

Note that the above expression is approximated by a gain drop and a phase delay as represented in the following expression in order to consider a response delay of the current controlling unit 6.

$$\begin{pmatrix} I_{df} \\ I_{qf} \end{pmatrix} \approx$$ [Expression 24]

$$\begin{pmatrix} g_d(\omega) \times \exp(-L_d(\omega) \times t) & 0 \\ 0 & g_q(\omega) \times \exp(-L_q(\omega) \times t) \end{pmatrix}$$

$$\begin{pmatrix} I_{dc} \\ I_{qc} \end{pmatrix}$$

Here, "gd(ω)" and "gq(ω)" are closed loop gains of the current controlling unit 6, "Ld(ω)" and "Lq(ω)" are waste times of the current controlling unit 6, and these gains and times are set by the motor parameter setting unit 4.

Moreover, from the above expression, the response delay of the current controlling unit 6 can be considered as in the following expression.

$$\begin{pmatrix} dI_{dc} \\ dI_{qc} \end{pmatrix} = \begin{pmatrix} \frac{A_d}{g_d(\omega)} \times \sin\left(P_d + \frac{L_d(\omega)}{\omega}\right) \\ \frac{A_q}{g_q(\omega)} \times \sin\left(P_q + \frac{L_q(\omega)}{\omega}\right) \end{pmatrix} \quad \text{[Expression 25]}$$

As described above, so as to satisfy [Expression 23], [Expression 24], and the like, the parameters "n", "ad", "pd", "aq" and "pq", the closed loop gains "gd(ω)" and "gq(ω)", and the waste times "Ld(ω)" and "Lq(ω)", which are set in the motor parameter setting unit 4, are set, and the d-axis current command value "Idco" outputted from the d-axis current instructing unit 2 and the q-axis current command value "Iqco" outputted from the q-axis current instructing unit 3 are corrected. In such a case, the (6×n)f sine component, (6×n)f cosine component, (6×(n+1))f sine component and (6×(n+1))f cosine component of the torque "T" shown in [Expression 22] are made zero, thus making it possible to reduce 6×n and 6×(n+1) ripple components and the like, which are generated in the motor 10, to a large extent.

As described above, in the first embodiment, the parameters "n", "ad", "pd", "aq", "pq" and the like of the motor parameter setting unit 4 are set so as to satisfy [Expression 23] and the like, and based on these parameters "n", "ad", "pd", "aq" and "pq", on the detection result of the rotation angle detecting unit 11, and on the like, the d-axis current command value "Idco" outputted from the d-axis current instructing unit 2 and the q-axis current command value "Iqco" outputted from the q-axis current instructing unit 3 are corrected. In such a way, the (6×n)f sine component, (6×n)f cosine component, (6×(n+1))f sine component and (6×(n+1))f cosine component of the torque "T" shown in [Expression 22] are made zero. Therefore, the 6×n and 6×(n+1) ripple components and the like, which are generated in the motor 10, can be suppressed, and the torque ripple of the motor 10 can be reduced to a large extent.

SECOND EMBODIMENT

Figure 4:
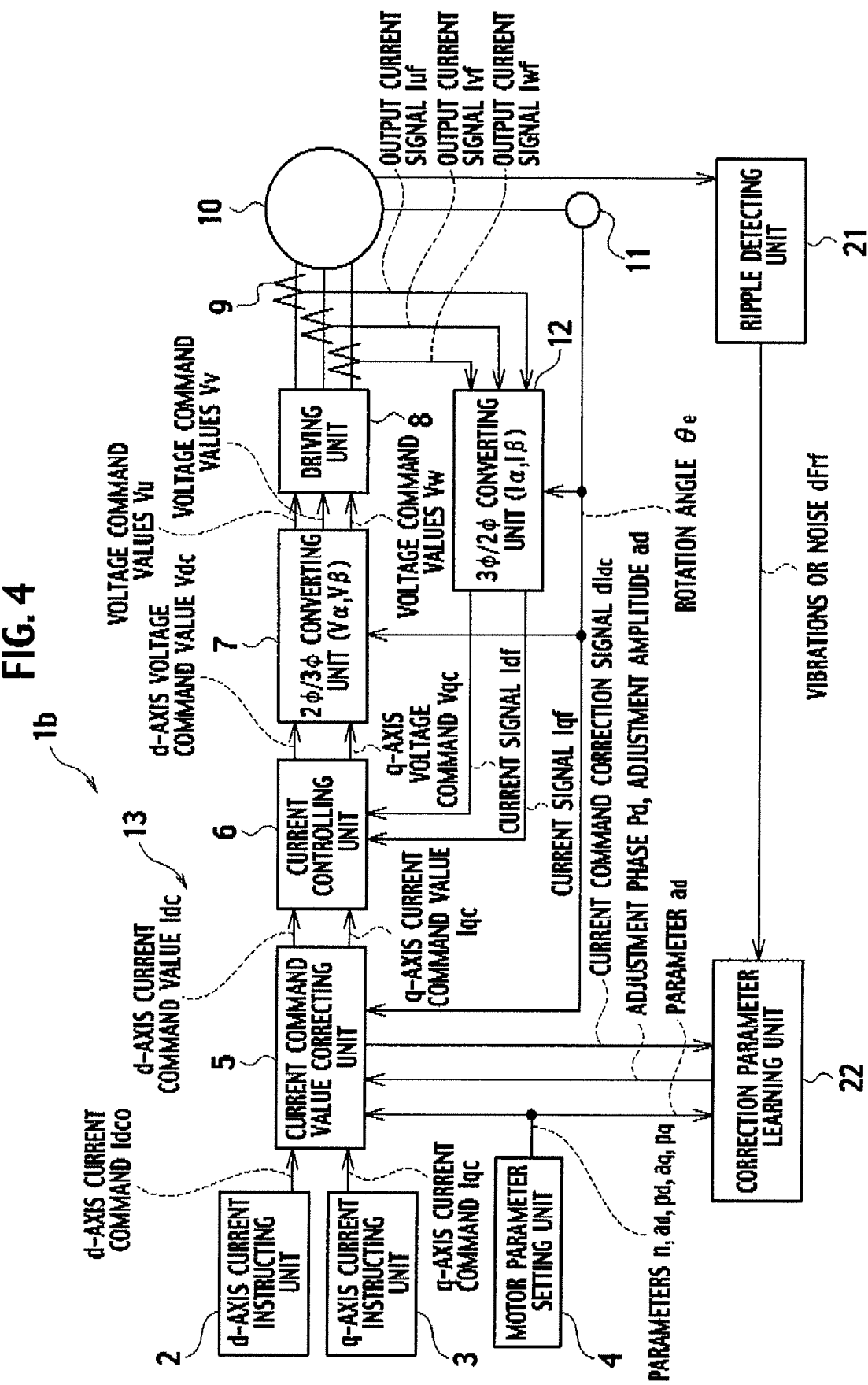
FIG. 4 is a block diagram showing a second embodiment of the control device according to the present invention.

FIG. 4 is a block diagram showing a second embodiment of the control device according to the present invention. Note that, in this drawing, the same reference numerals are assigned to portions corresponding to the respective portions of FIG. 2.

A different point of a control device 1b shown in this drawing from the control device 1a shown in FIG. 2 is that there are provided: a ripple detecting unit 21 that detects vibrations or noise "dFrf" of the motor 10; and a correction parameter learning unit 22 that learns parameters related to the vibrations and noise of the motor 10, for example, the parameters "ad", "pd" and the like among the parameters "n", "ad", "pd", "aq" and "pq" for use in the current command correcting unit 5 based on an output of the ripple detecting unit 21.

Figure 5:
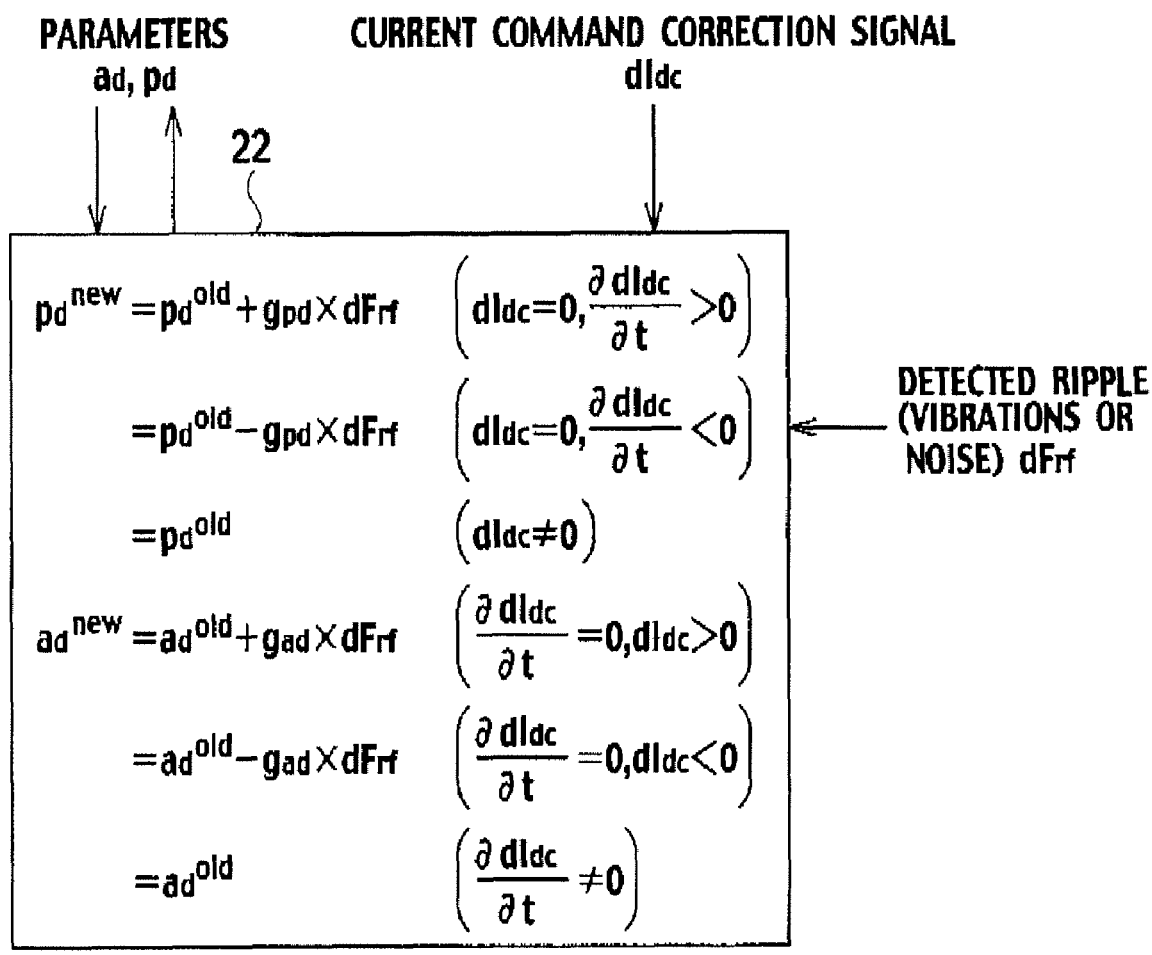
FIG. 5 is an explanatory view showing a detailed operation example of a correction parameter learning unit shown in FIG. 4.

Next, a description will be made of detailed operations of the ripple detecting unit 21, the current command correcting unit 5, and the correction parameter learning unit 22 with reference to FIG. 5.

In the current command correcting unit 5, based on a learning result of the correction parameter learning unit 22, the d-axis current command value "Idco" outputted from the d-axis current instructing unit 2 and the q-axis current command value "Iqco" outputted from the q-axis current instructing unit 3 are corrected so as to reduce the vibrations or noise "dFrf", and so that the ripple of force "Fr" in a radius direction of the motor 10 can be small.

In this case, the force "Fr" in the radius direction, which corresponds to a current command correction signal "dIc", becomes the sum of constant terms, (6×n)f sine component, (6×n)f cosine component, (6×(n+1))f sine component, and (6×(n+1))f cosine component of the rotation angle, which is as represented in the following expression.

$$\begin{aligned} F_r &= \frac{\partial W}{\partial r} \quad \text{[Expression 26]} \\ &= F_{ro}(a_d, P_d, a_q, p_q) + F_{r6ns}(a_d, p_d, a_q, p_q) \times \\ &\quad \sin(6 \times n \times \theta_e) + F_{r6nc}(a_d, p_d, a_q, p_q) \times \\ &\quad \cos(6 \times n \times \theta_e) + F_{r6(n+1)s}(a_d, p_d, a_q, p_q) \times \\ &\quad \sin(6 \times (n+1) \times \theta_e) + \\ &\quad F_{r6(n+1)c}(a_d, p_d, a_q, p_q) \times \cos(6 \times (n+1) \times \theta_e) \end{aligned}$$

Here, "W" is the magnetic energy in the motor 10, and "r" is the radius direction.

From the above expression, initial values of the adjustment amplitudes "ad" and "aq" and the adjustment phases "pd" and "pq" are obtained so as to satisfy the following expression.

$$\begin{pmatrix} F_{r6ns}(a_d, p_d, a_q, p_q) \\ F_{r6nc}(a_d, p_d, a_q, p_q) \\ F_{r6(n+1)s}(a_d, p_d, a_q, p_q) \\ F_{r6(n+1)c}(a_d, p_d, a_q, p_q) \end{pmatrix} = \begin{pmatrix} 0 \\ 0 \\ 0 \\ 0 \end{pmatrix} \quad \text{[Expression 27]}$$

Meanwhile, in the ripple detecting unit 21, the vibrations or noise "dFrf" is detected, and is outputted to the correction parameter learning unit 22.

In the correction parameter learning unit 22, an adjustment amplitude and an adjustment phase, for example, the adjustment amplitude "ad" and the adjustment phase "pd" which affect the vibrations or noise of the motor 10, are learned by using the vibrations or noise "dFrf" detected by the ripple detecting unit 21.

In this case, for example, as represented in the following expression, the adjustment phase "pd" is learned by using the vibrations or noise "dFrf" of the point of time when the current command correction signal "dIdc" becomes "0" (where the current command correction signal becomes the maximum or the minimum), and the parameter "pd" for use in the current command value correcting unit 5 is optimized.

$$\begin{aligned} P_d^{new} &= P_d^{old} + g_{pd} \times dF_{rf}\left(dI_{dc} = 0, \frac{\partial dI_{dc}}{\partial t} > 0\right) \quad \text{[Expression 28]} \\ &= P_d^{old} - g_{pd} \times dF_{rf}\left(dI_{dc} = 0, \frac{\partial dI_{dc}}{\partial t} < 0\right) \\ &= P_d^{old} \, (dI_{dc} \neq 0) \end{aligned}$$

Here, "gpd" is a learning gain, "old" is a value of the parameter before the learning, and "new" is a value of the parameter after the learning.

Moreover, the adjustment amplitude "ad" is learned, for example, by using the vibrations or noise "dFrf" of the point of time when a time derivative of the current command correction signal "dIc" becomes "0" as represented in the following expression, and the parameter "ad" for use in the current command value correcting unit 5 is optimized, $$a_d^{new} = a_d^{old} + g_{ad} \times dF_{rf}\left(\frac{\partial dI_{dc}}{\partial t} = 0, dI_{dc} > 0\right)$$
$$= a_d^{old} - g_{ad} \times dF_{rf}\left(\frac{\partial dI_{dc}}{\partial t} = 0, dI_{dc} < 0\right)$$
$$= a_d^{old}\left(\frac{\partial dI_{dc}}{\partial t} \neq 0\right)$$

[Expression 29]

Here, "gad" is a learning gain.

As described above, in the second embodiment, the parameters "n", "ad", "pd", "aq", "pq" and the like of the motor parameter setting unit 4 are set so as to satisfy [Expression 27], and based on these parameters "n", "ad", "pd", "aq" and "pq", on the detection result of the rotation angle detecting unit 11, and on the like, the d-axis current command value "Idco" outputted from the d-axis current instructing unit 2 and the q-axis current command value "Iqco" outputted from the q-axis current instructing unit 3 are corrected. Then, the (6×n)f sine component, the (6×n)f cosine component, the (6×(n+1))f sine component, and the (6×(n+1))f cosine component, which are contained in the torque "T" of the motor 10, are made zero. In addition, based on the ripple "dFrf" of the time when the time derivative of the current command correction signal "dIdc" created by the current command value correcting unit 5 becomes zero, the parameters "pd" and "ad" are adjusted by the correction parameter learning unit 22. Therefore, the 6×n and 6×(n+1) ripple components and the like can be suppressed, and the vibrations and noise of the motor 10 can be reduced to a large extent while reducing the torque ripple of the motor 10 to a large extent.

Note that, in the second embodiment, the parameters "pd" and "ad" for use in the current command value correcting unit 5 are directly adjusted by such a learning operation of the correction parameter learning unit 22: however, a configuration may be adopted, in which the parameters "pd" and "ad" after the learning are displayed on a notification device such as a display device by the correction parameter learning unit 22, and an operator or the like is allowed to confirm the parameters "pd" and "ad", then the operator is allowed to operate the motor parameter setting unit 4, whereby the parameters "pd" and "ad" set in this motor parameter setting unit 4 are changed.

THIRD EMBODIMENT

Figure 6:
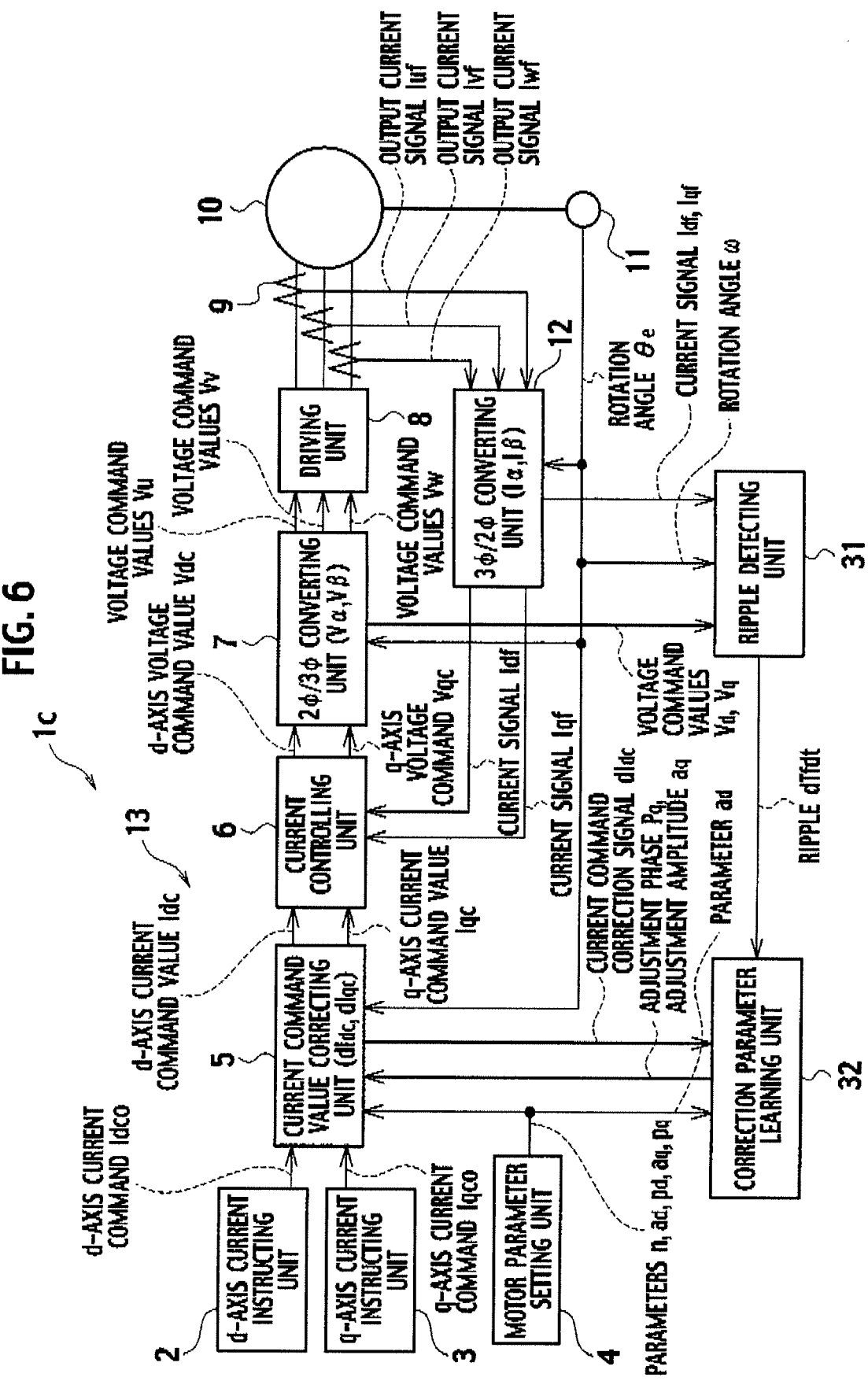
FIG. 6 is a block diagram showing a third embodiment of the control device according to the present invention.
Figure 7:
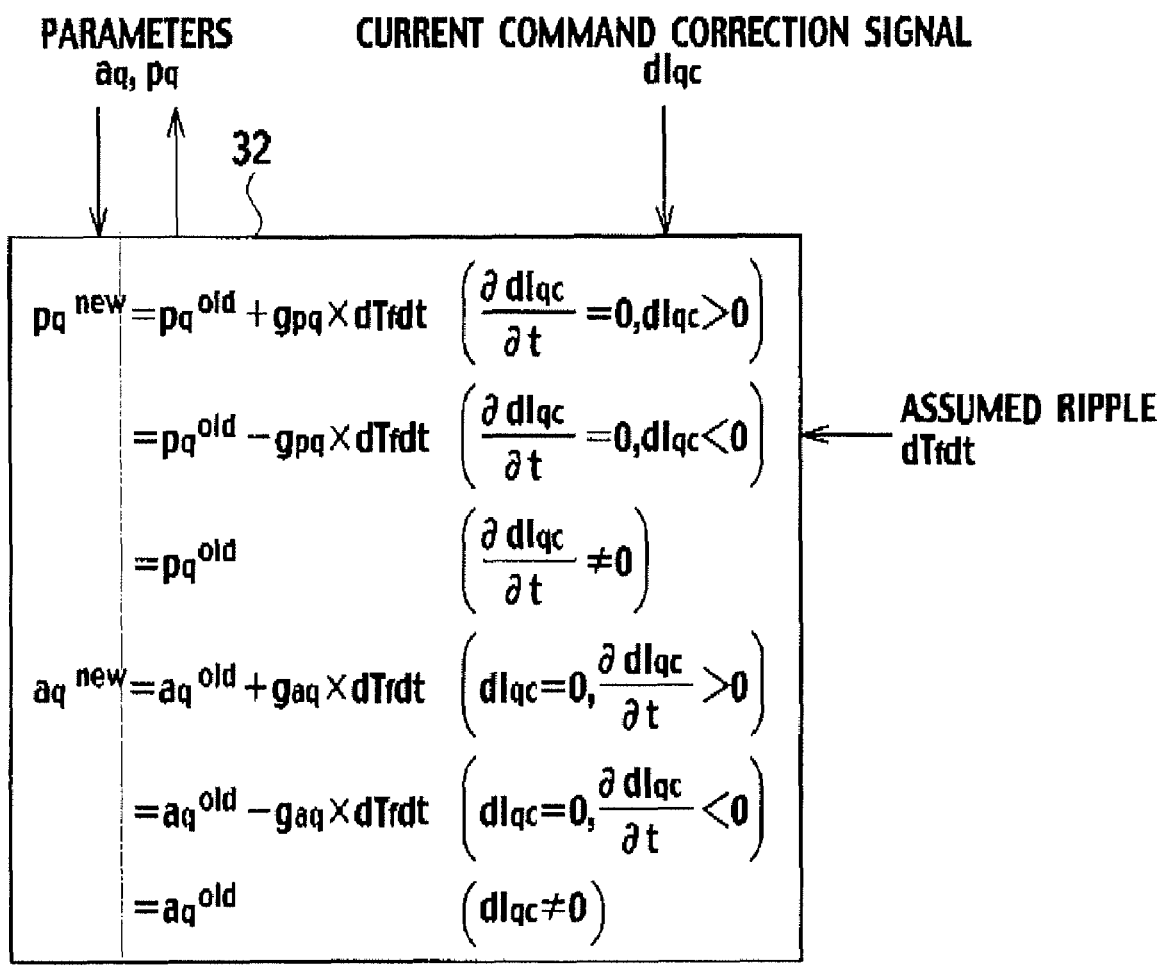
FIG. 7 is an explanatory view showing a detailed operation example of a correction parameter learning unit shown in FIG. 6.

FIG. 6 is a block diagram showing a third embodiment of the control device according to the present invention. Note that, in this drawing, the same reference numerals are assigned to portions corresponding to the respective portions of FIG. 2.

A different point of a control device 1c shown in this drawing from the control device 1a shown in FIG. 2 is that there are provided: a ripple assuming unit 31 that assumes a ripple "dTfdt" of the motor 10 based on the d-axis voltage command "Vd" and the q-axis voltage command "Vq", which are outputted from the current controlling unit 6, on the current values (current signals "Idf" and "Iqf" outputted from the 3-phase/2-phase converting unit 12) detected by the current detecting unit 9, and on the rotation angle "ω" corresponding to the rotation angle "θe" detected by the rotation angle detecting unit 11; and a correction parameter learning unit 32 that learns, from the assumed ripple "dTfdt", the parameters related to the vibrations and noise of the motor 10, for example, the parameters "aq", "pq", and the like among the parameters "n", "ad", "pd", "aq" and "pq" for use in the current command correcting unit 5.

Next, a description will be made of detailed operations of the ripple assuming unit 31, the current command correcting unit 5, and the correction parameter learning unit 32.

In the ripple assuming unit 31, the ripple "dTfdt" of the motor 10 is assumed from the d-axis voltage command "Vdc" outputted from the current controlling unit 6, from the voltage commands "Vd" and "Vq" corresponding to the d-axis current command "Vqc", from the current signals "Idf" and "Iqf" outputted from the 3-phase/2-phase converting unit 12, and from the rotation angle "ω" outputted from the rotation angle detecting unit 11.

In this case, in the ripple assuming unit 31, induction voltages "Edf" and "Eqf" are assumed from the voltage command values "Vd" and "Vq", the current signals "Idf" and "Iqf", and the rotation angle "ω", for example, by using the following expression.

$$\begin{pmatrix} E_{df} \\ E_{qf} \end{pmatrix} = \begin{pmatrix} Ra + s \times L_d & -\omega \times L_q \\ \omega \times L_d & Ra + s \times L_q \end{pmatrix} \begin{pmatrix} I_{df} \\ I_{qf} \end{pmatrix} - \begin{pmatrix} V_d \\ V_q \end{pmatrix}$$

[Expression 30]

Here, "Ra" is a coil resistance of the motor 10, "Ld" and "Lq" are inductances of the d-axis and the q-axis, respectively, and these values are set by the motor parameter setting unit 4.

Then, an arithmetic operation shown in the following expression is performed from the assumed induction voltages "Edf" and "Eqf", the current signals "Idf" and "Iqf", and the rotation angle "ω", and the ripple "dTfdt" represented in a form of the time derivative of the torque is assumed, and is outputted to the correction parameter learning unit 32.

$$dT_f dt = \frac{\partial T_f}{\partial t} = \frac{\partial\left(\frac{E_{df} \times I_{df} + E_{qf} \times I_{qf}}{\omega}\right) + (L_d - L_q) \times I_{df} \times I_{qf}}{\partial t}$$

[Expression 31]

In the correction parameter learning unit 32, the adjustment amplitude "aq" and the amplitude phase "pq" are learned by using the ripple "dTfdt" assumed by the ripple assuming unit 31.

In this case, the amplitude phase "pq" is learned, for example, by using the ripple "dTfdt" of the point of time when the time derivative of the current command correction signal "dIqc" created by the current command value correcting unit 5 becomes "0" (where the current command correction signal becomes the maximum or the minimum), and the parameter "pq" for use in the current command value correcting unit 5 is optimized.

$$P_q^{new} = P_q^{old} + g_{pq} \times dT_f dt\left(\frac{\partial dI_{qc}}{\partial t} = 0, dI_{qc} > 0\right)$$

[Expression 32]

-continued $$= P_q^{old} - g_{pq} \times dT_f dt \left( \frac{\partial dI_{qc}}{\partial t} = 0, dI_{qc} < 0 \right)$$

$$= P_q^{old} \left( \frac{\partial dI_{qc}}{\partial t} \neq 0 \right)$$

Here, "gpq" is a learning gain.

Moreover, the adjustment amplitude "aq" is learned, for example, by using the ripple "dTfdt" of the point of time when a time derivative of the current command correction signal "dIqc" becomes "0", and the parameter "aq" for use in the current command value correcting unit 5 is optimized.

$$a_q^{new} = a_q^{old} + g_{aq} \times dT_f dt \left( dI_{qc} = 0, \frac{\partial dI_{qc}}{\partial t} > 0 \right)$$ [Expression 33]

$$= a_q^{old} - g_{aq} \times dF_f dt \left( dI_{qc} = 0, \frac{\partial dI_{qc}}{\partial t} < 0 \right)$$

$$= a_q^{old} (dI_{qc} \neq 0)$$

Here, "gaq" is a learning gain.

As described above, in the third embodiment, based on the d-axis voltage command "Vd" and the "q-axis voltage command "Vq", which are outputted from the current controlling unit 6, on the current values (current signals "Idf" and "Iqf" outputted from the 3-phase/2-phase converting unit 12) detected by the current detecting unit 9, and on the rotation angle "ω" corresponding to the rotation angle "θe" detected by the rotation angle detecting unit 11, the ripple "dTfdt" of the motor 10 is assumed by using [Expression 29], [Expression 30], and [Expression 31]. In addition, based on the ripple "dFrf" of the time when the time derivative of the current command correction signal "dIqc" created by the current command value correcting unit 5 becomes zero, the parameters "pq" and "aq" are adjusted by the correction parameter learning unit 22. Therefore, the 6×n and 6×(n+1) ripple components and the like can be suppressed, and the vibrations and noise of the motor 10 can be reduced to a large extent while reducing the torque ripple of the motor 10 to a large extent, and only by renovation work for the inside of the device without attaching the ripple detecting unit or the like to the motor 10 (effect of claim 3).

FOURTH EMBODIMENT

Figure 8:
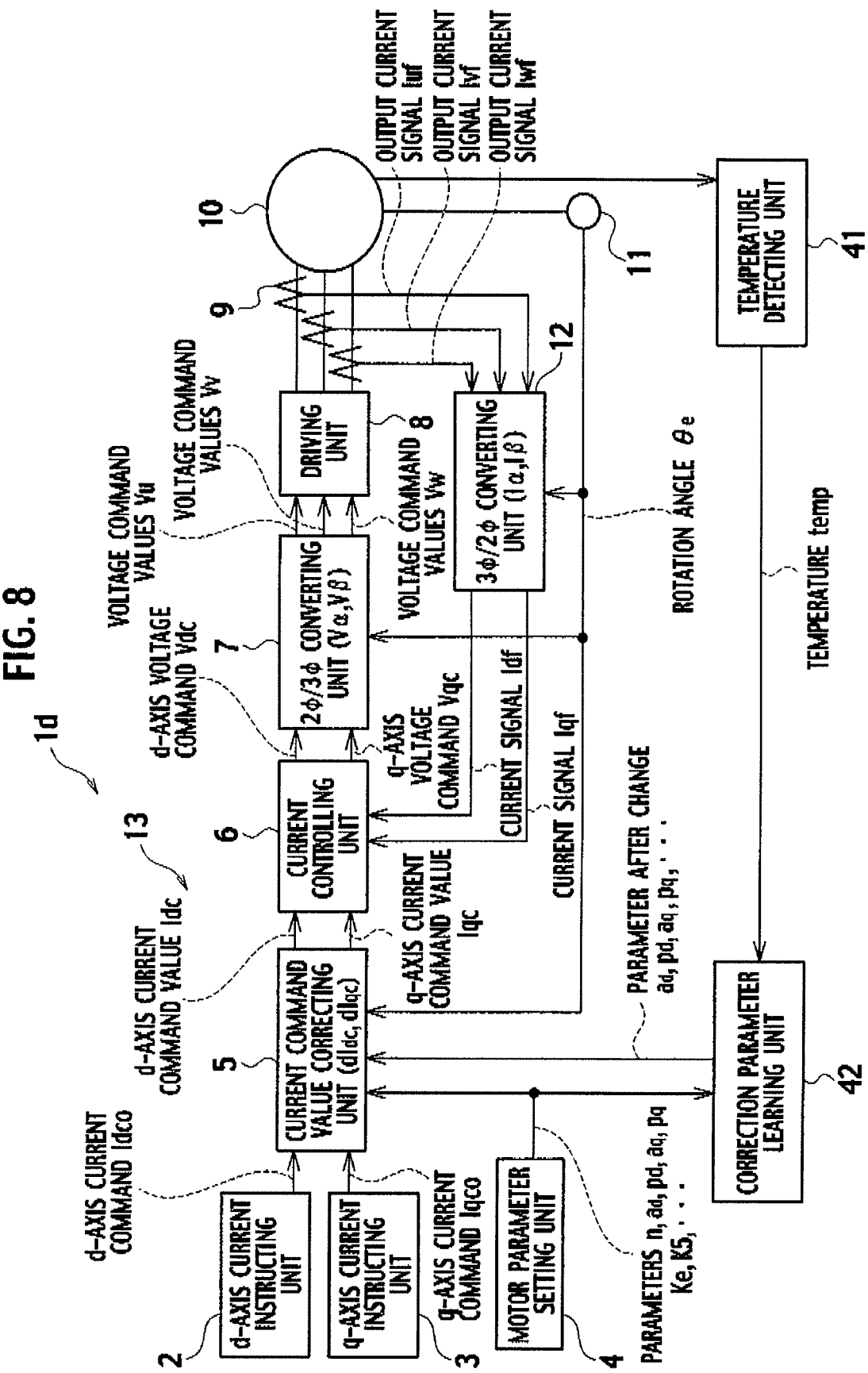
FIG. 8 is a block diagram showing a fourth embodiment of the control device according to the present invention.

FIG. 8 is a block diagram showing a fourth embodiment of the control device according to the present invention. Note that, in this drawing, the same reference numerals are assigned to portions corresponding to the respective portions of FIG. 2.

A different point of a control device 1d shown in this drawing from the control device 1a shown in FIG. 2 is that there are provided: a temperature detecting unit 41 that detects a temperature "temp" of the motor 10; and a correction parameter changing unit 42 that changes the respective correction parameters, for example, correction parameters "Ke", "K5" . . . , of the current command correcting unit 5 according to the detected temperature "temp".

Figure 9:
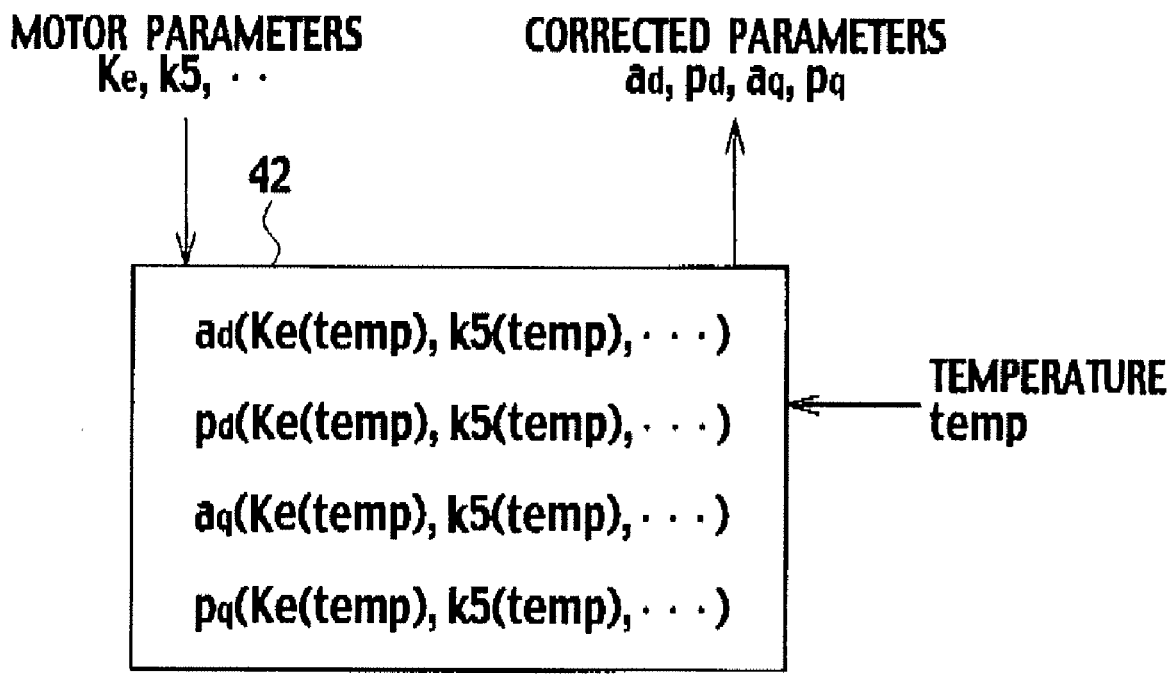
FIG. 9 is an explanatory view showing a detailed operation example of a correction parameter changing unit shown in FIG. 8.

Next, a description will be made of detailed operations of the temperature detecting unit 41 and the correction parameter changing unit 42 with reference to FIG. 9.

First, in the temperature detecting unit 43, the temperature "temp" of the motor is detected, and is outputted to a correction parameter changing unit 16.

In the correction parameter changing unit 16, the motor parameters "Ke", "K5" . . . , and the like corresponding to the temperature "temp" are changed according to the detected temperature "temp", and the parameters "ad", "pd", "aq", "pq", and the like containing these motor parameters "Ke", "K5" . . . , and the like are changed.

In this case, if a coefficient of the induction voltage "Eu" in [Expression 7] and the like is a function of the temperature "temp", then the following expression is established.

$$E_u(\theta_e) = -\omega \times Ke(\text{temp}) \times (\sin(\theta_e) + k5(\text{temp}) \times \sin(5 \times \theta_e) + \ldots)$$ [Expression 34]

Then, when the coefficient of the induction voltage "Eu" is the function of the temperature "temp", the parameters "ad", "pd", "aq", "pq" and the like for use in the case of obtaining such d-axis current command value "Idc" and q-axis current command value "Iqc" that cancel the torque ripple also become functions of the temperature "temp". Accordingly, the parameters "ad", "pd", "aq" and "pq" are changed in response to the detected temperature "temp" in a similar procedure to such a derivation procedure of the above [Expression 23].

As described above, in the fourth embodiment, the temperature "temp" of the motor 10 is detected by the temperature detecting unit 41, and the parameters "ad", "pd", "aq", "pq" and the like which have become the functions of the temperature "temp" are changed by the correction parameter changing unit 42. Therefore, in response to the temperature "temp" of the motor 10, the parameters "ad", ">pd", "aq", "pq" and the like are optimized, and the d-axis current command value "Idc" and the q-axis current command value "Iqc" are corrected. In such a way, even if the temperature of the motor 10 is changed, the torque ripple can be suppressed to the minimum.

FIFTH EMBODIMENT

Figure 10:
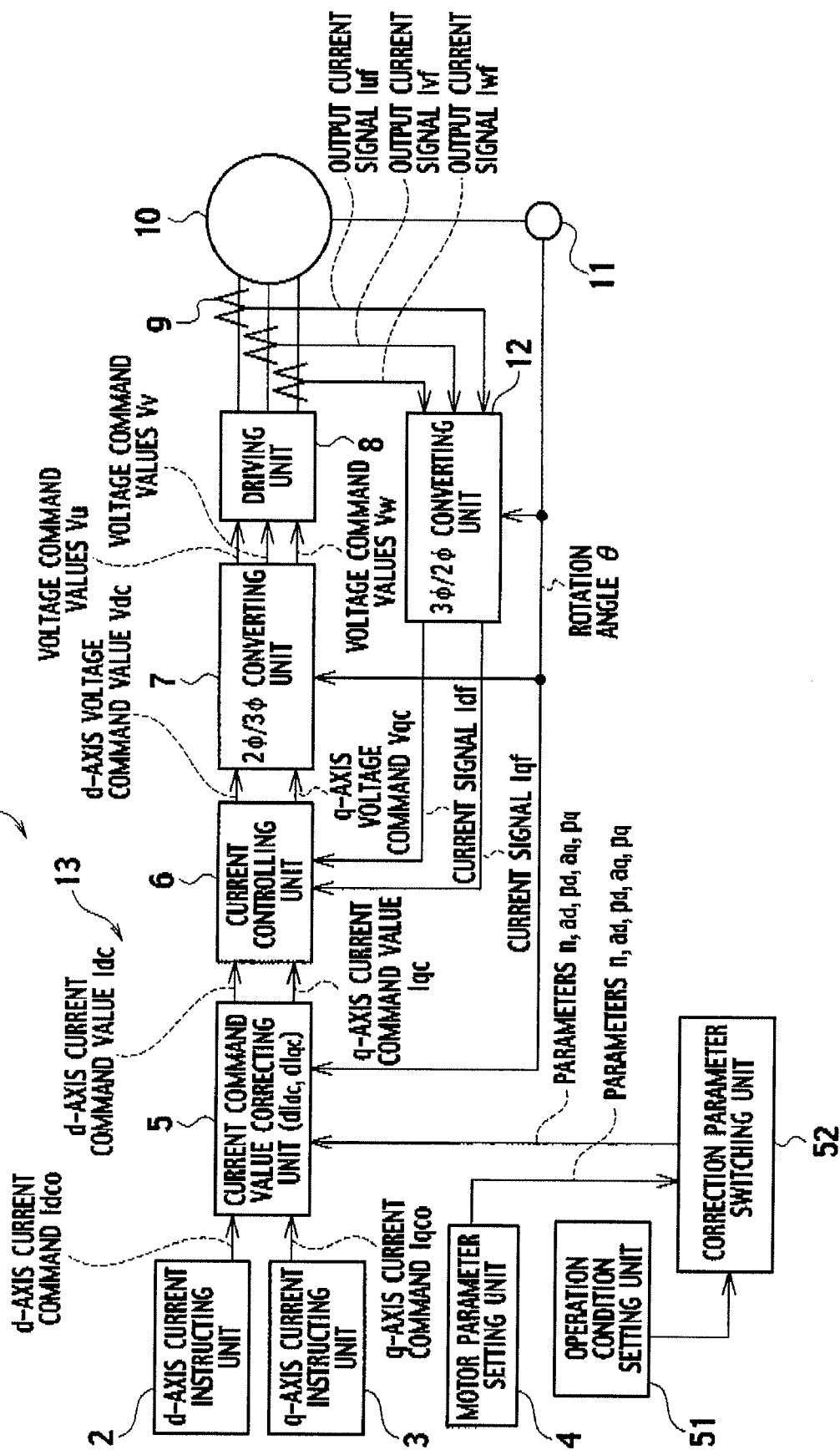
FIG. 10 is a block diagram showing a fifth embodiment of the control device according to the present invention.

FIG. 10 is a block diagram showing a fifth embodiment of the control device according to the present invention. Note that, in this drawing, the same reference numerals are assigned to portions corresponding to the respective portions of FIG. 2.

A different point of a control device 1e shown in this drawing from the control device 1a shown in FIG. 2 is that there are provided: an operation condition setting unit 51 that sets operation conditions; and a correction parameter switching unit 52 that switches the parameters "ad", "pd", "aq", "pq" and the like of the current command correcting unit 5 according to the operation conditions.

Figure 11:
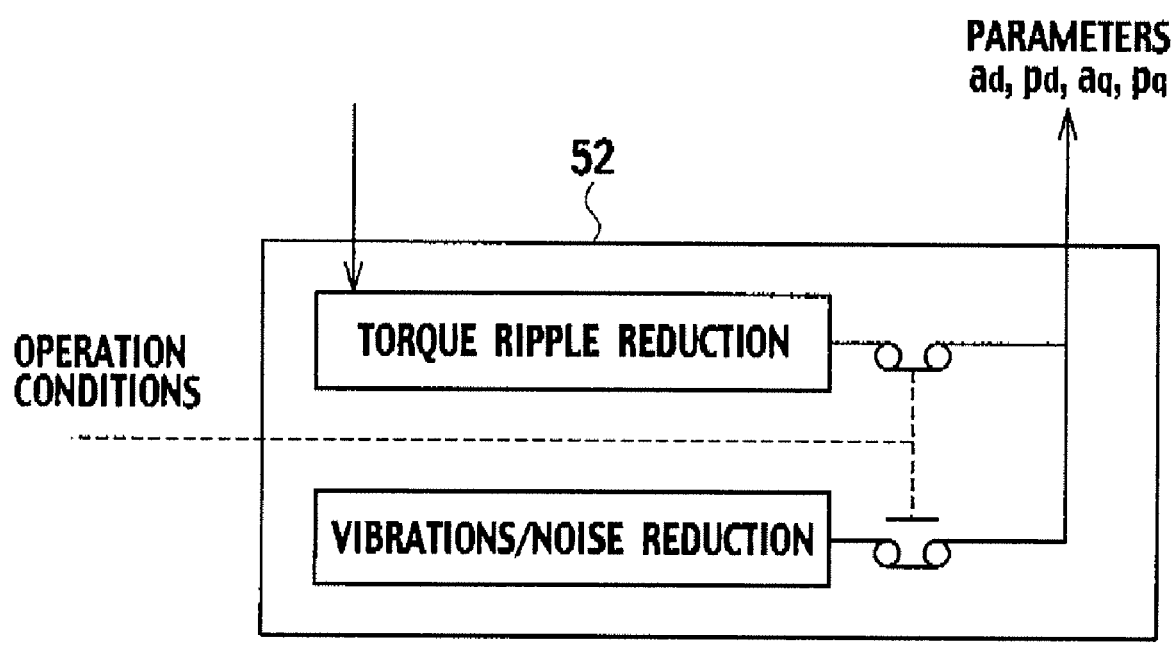
FIG. 11 is an explanatory view showing a detailed operation example of a correction parameter switching unit shown in FIG. 10.

Next, a description will be made of detailed operations of the operation condition setting unit 51 and the correction parameter switching unit 52 with reference to FIG. 11.

In response to the operation conditions, the operation condition setting unit 51 is operated, any one of the respective contacts provided in the correction parameter switching unit 52 is turned to an ON state, and the parameters "ad", "pd", "aq", "gpq" and the like for use in the current command correcting unit 5 are switched.

With regard to the switching for the parameters "ad", "pd", "aq", "pq" and the like, for example, in the operation condition setting unit 51, either a torque ripple reduction operation or a vibration/noise reduction operation is designated, and the parameters "ad", "pd", "aq", "pq" and the like are switched so as to correspond to contents of the designation.

For example, in the case of reducing the torque ripple, the parameters are set so as to satisfy the following expression.

$$\begin{pmatrix} T_{6ns}(a_d, p_d, a_q, p_q) \\ T_{6nc}(a_d, p_d, a_q, p_q) \\ T_{6(n+1)s}(a_d, p_d, a_q, p_q) \\ T_{6(n+1)c}(a_d, p_d, a_q, p_q) \end{pmatrix} = \begin{pmatrix} 0 \\ 0 \\ 0 \\ 0 \end{pmatrix} \quad \text{[Expression 35]}$$

Moreover, in the case of reducing the vibrations/noise, the parameters are set so as to satisfy the following expression.

$$\begin{pmatrix} F_{r6ns}(a_d, p_d, a_q, p_q) \\ F_{r6nc}(a_d, p_d, a_q, p_q) \\ F_{r6(n+1)s}(a_d, p_d, a_q, p_q) \\ F_{r6(n+1)c}(a_d, p_d, a_q, p_q) \end{pmatrix} = \begin{pmatrix} 0 \\ 0 \\ 0 \\ 0 \end{pmatrix} \quad \text{[Expression 36]}$$

In such a way, for example at a midnight, the motor 10 can be operated while mainly targeting the reduction of the vibrations/noise of the motor 10, and meanwhile in a daytime, the motor 10 can be operated while mainly targeting reduction of an uneven rotation of the motor 10.

Moreover, with regard to the operation conditions, the parameters may be appropriately switched according to a rotation speed and the like, for example, so that the reduction of the torque ripple can be mainly treated at a low speed and that the reduction of the vibrations/noise, and the like can be mainly treated at a high speed.

As described above, in the fifth embodiment, in response to the operation conditions, the operation condition setting unit 51 is operated, any one of the respective contacts provided in the correction parameter switching unit 52 is turned to the ON state, and the parameters "ad", "pd", "aq", "pq" and the like for use in the current command correcting unit 5 are switched. Therefore, the optimum parameters "ad", "pd", "aq", "pq" and the like corresponding to the respective operation conditions can be selected in response to the contents of the operation, and the reduction of the torque ripple, the reduction of the vibrations and the noise, and the like can be realized.

SIXTH EMBODIMENT

Figure 12:
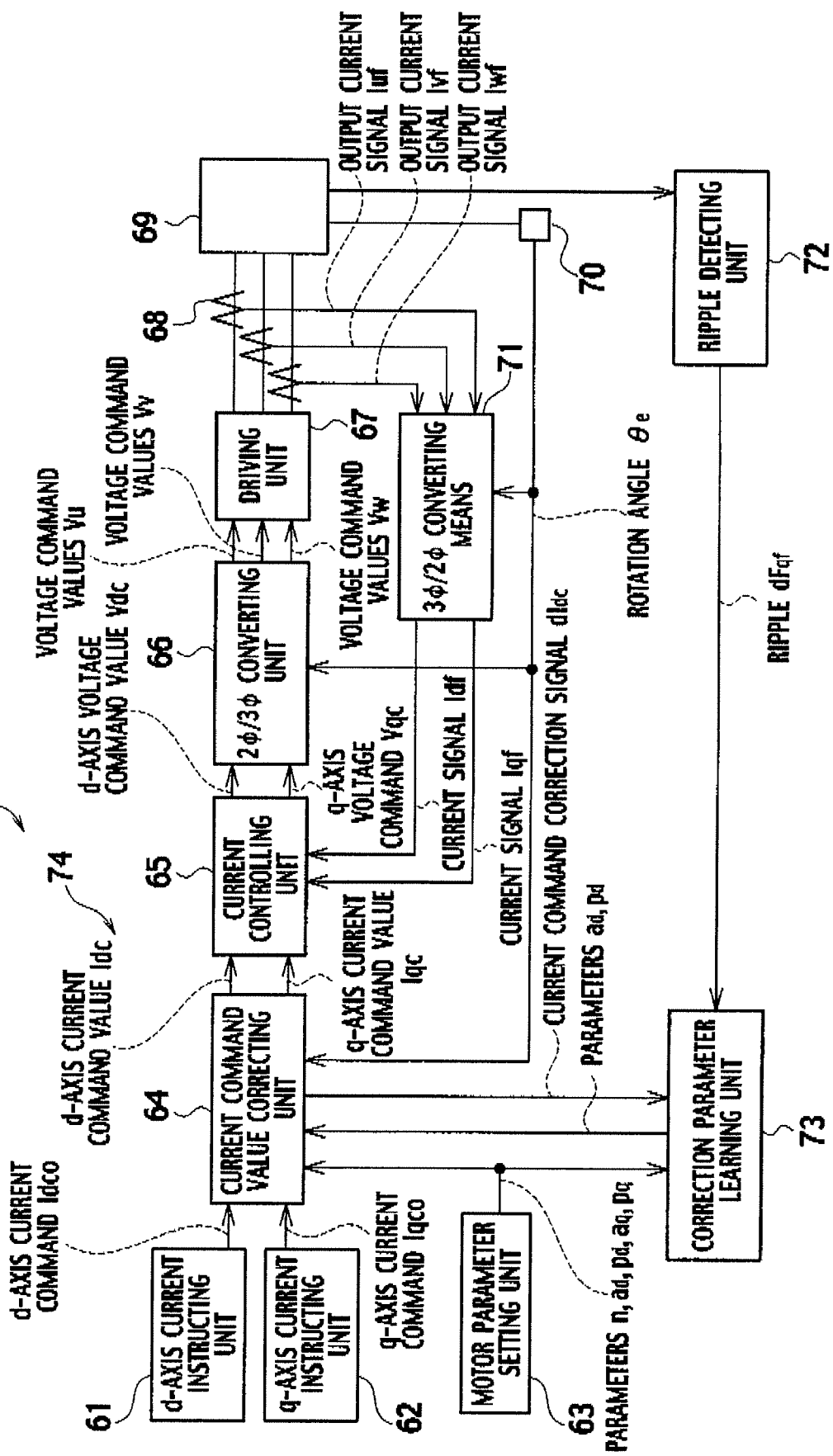
FIG. 12 is a block diagram showing a sixth embodiment of the control device according to the present invention.

FIG. 12 is a block diagram showing a sixth embodiment of the control device according to the present invention.

A control device 1f shown in this drawing includes: a d-axis current instructing unit 61 that outputs the d-axis current command "Idco"; a q-axis current instructing unit 62 that outputs the q-axis current command "Iqco"; and a motor parameter setting unit 63 in which the parameters "n", "ad", "pd", "aq", "pq" and the like of a linear motor 69 are set.

Moreover, this control device 1f includes: an electrical angle detecting unit 70 that detects the electrical angle "θe" of the linear motor 69; a current detecting unit 68 that detects 3-phase currents of the linear motor 69, and outputs the output current signals "Iuf", "Ivf" and "Iwf"; and a 3-phase/2-phase converting unit 71 that arithmetically operates the d-axis current signal "Idf" and the q-axis current signal "Iqf" based on the output current signals "Iuf", "Ivf" and "Iwf".

Furthermore, this control device 1f includes: a current command correcting unit 64 that corrects the d-axis current command "Idco" outputted from the d-axis current instructing unit 61 and the q-axis current command "Iqco" outputted from the q-axis current instructing unit 62 based on the parameters "n", "ad", "pd", "aq" and "pq" of the linear motor 69, which are outputted from the motor parameter setting unit 63, and on a detection result of the electrical angle detecting unit 70, and outputs the d-axis current command value "Idc" and the q-axis current command value "Iqc"; a current controlling unit 65 that arithmetically operates the d-axis voltage command "Vdc" and the q-axis voltage command "Vqc" based on the d-axis current command value "Idc" and the q-axis current command value "Iqc", which are outputted from the current command correcting unit 64, and on the d-axis current signal "Idf" and the q-axis current signal "Iqf", which are outputted from the 3-phase/2-phase converting unit 71; a 2-phase/3-phase converting unit 66 that arithmetically operates the voltage command values "Vu", "Vv" and "Vw" of three phases based on the d-axis voltage command "Vdc" and the q-axis voltage command "Vqc", which are outputted from the current controlling unit 65; and a driving unit 67 that outputs the drive voltage and drives the linear motor 69 based on the voltage command values "Vu", "Vv" and "Vw" outputted from the 2-phase/3-phase converting unit 66.

Still further, this control device 1f includes: a ripple detecting unit 72 that detects the vibrations or noise of the linear motor 69 and outputs the ripple "dFrf"; and a correction parameter learning unit 73 that learns the parameters related to the vibrations and noise of the linear motor 69, for example, the parameters "ad", "pd" and the like among the parameters "n", "ad", "pd", "aq" and "pq" for use in the current command correcting unit 64 based on the output of the ripple detecting unit 72.

Figure 13:
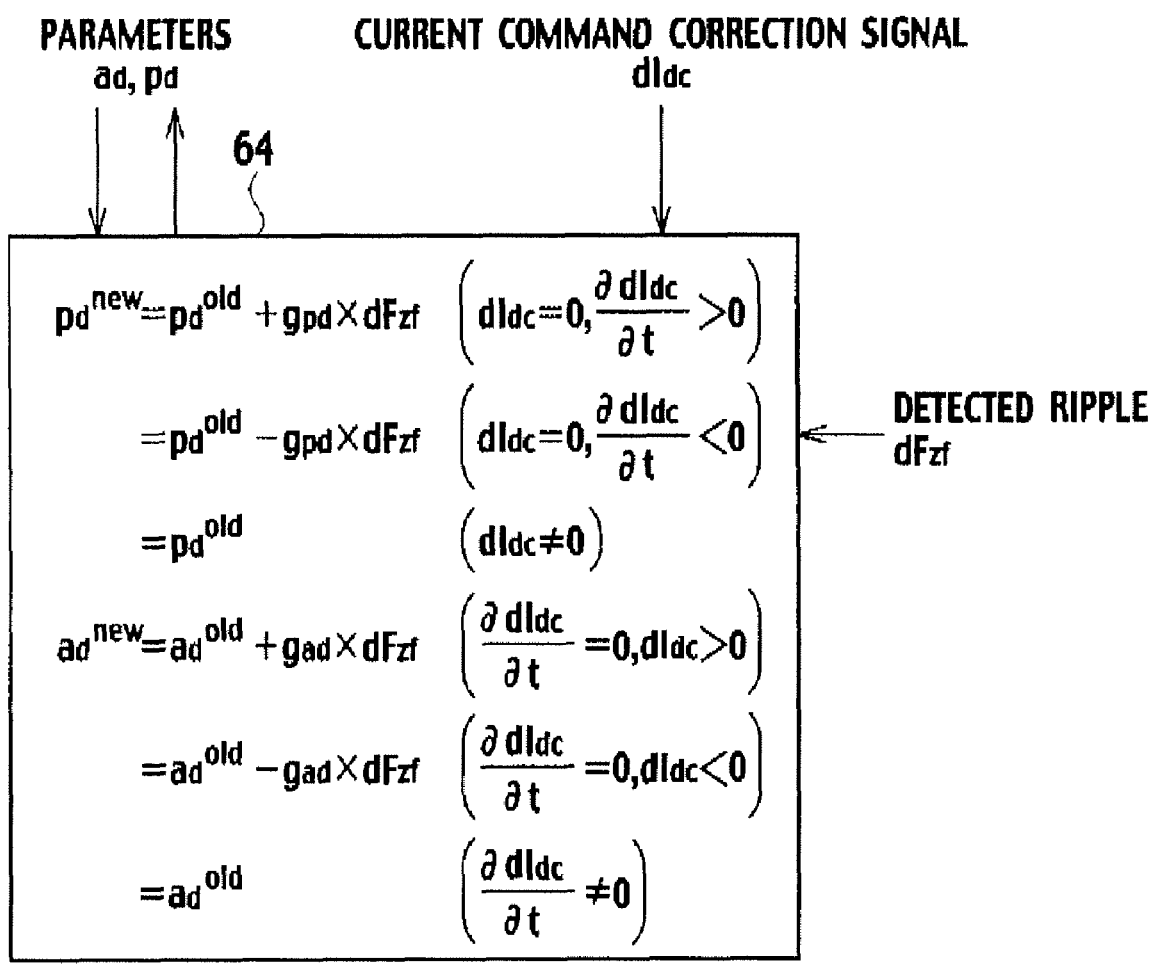
FIG. 13 is an explanatory view showing a detailed operation example of a correction parameter learning unit shown in FIG. 12.

Next, a description will be made of an operation of the control device 1f with reference to FIG. 12 and FIG. 13.

The electrical angle "θe" of the linear motor 69 is detected through the electrical angle detecting unit 70 such as a linear scale, and is inputted to a speed control system (portion composed of the d-axis current instructing unit 61, the q-axis current instructing unit 62, and the current command correcting unit 64) 74 that controls a speed of the linear motor 69.

In the current command correcting unit 64, an actual speed of the linear motor 69 is calculated based on the electrical angle "θe" outputted from the electrical angle detecting unit 70, and from a speed deviation signal between the speed concerned and a speed command value thereto, the d-axis current command value "Idc" and the q-axis current command value "Iqc" are created, and are outputted to the current controlling unit 65.

Moreover, the current command correcting unit 8 reduces the vibrations in a direction (Z-direction) perpendicular to thrust, and corrects the ripple "dFrf" of force in a vibration direction so as to be small in a procedure to be described below.

First, by the current command correcting unit 64, the d-axis current command "Idco" outputted from the d-axis current instructing unit 61 and the q-axis current command "Iqco" outputted from the q-axis current instructing unit 62 are corrected, and the current command correction signal "dIdc", the d-axis current command value "Idc", the q-axis current command value "Iqc", and the like are created. In this case, the force "Fz" in the vibration direction, which is generated by the linear motor 69, becomes the sum of constant terms, (6×n)f sine component, (6×n)f cosine component, (6×(n+1))f sine component, and (6×(n+1))f cosine component of the electrical angle "θe", which is as represented in the following expression.

$$F_z = F_{z0}(a_d, p_d, a_q, p_q) + \quad \text{[Expression 37]}$$
$$F_{z6ns}(a_d, p_d, a_q, p_q) \times \sin(6 \times n \times \theta_e) +$$

-continued
$$F_{z6nc}(a_d, p_d, a_q, p_q) \times \cos(6 \times n \times \theta_e) +$$
$$F_{z6(n+1)s}(a_d, p_d, a_q, p_q) \times \sin(6 \times (n+1) \times \theta_e) +$$
$$F_{z6(n+1)c}(a_d, p_d, a_q, p_q) \times \cos(6 \times (n+1) \times \theta_e)$$

Here, "z" is the vibration direction.

From the above expression, initial values of the adjustment amplitudes "ad" and "aq" and the adjustment phases "pd" and "pq" are obtained so as to satisfy the following expression.

$$\begin{pmatrix} F_{z6ns}(a_d, p_d, a_q, p_q) \\ F_{z6nc}(a_d, p_d, a_q, p_q) \\ F_{z6(n+1)s}(a_d, p_d, a_q, p_q) \\ F_{z6(n+1)c}(a_d, p_d, a_q, p_q) \end{pmatrix} = \begin{pmatrix} 0 \\ 0 \\ 0 \\ 0 \end{pmatrix}$$ [Expression 38]

Moreover, in the ripple detecting unit 72, the vibrations or noise "dFrf" is detected, and is outputted to the correction parameter learning unit 22.

In the correction parameter learning unit 22, the adjustment amplitude "ad" and the adjustment phase "pd" are learned by using the vibrations or noise "dFrf" detected by the ripple detecting unit 21.

In this case, for example, as represented in the following expression, the adjustment phase "pd" is learned by using the vibrations or noise "dFrf" of the point of time when the current command correction signal "dIdc" becomes "0" (where the current command correction signal becomes the maximum or the minimum), and the parameter "pd" for use in the current command value correcting unit 5 is optimized.

$$P_d^{new} = P_d^{old} + g_{pd} \times dF_{zf}\left(dI_{dc} = 0, \frac{\partial I_{dc}}{\partial t} > 0\right)$$ [Expression 39]
$$= P_d^{old} - g_{pd} \times dF_{zf}\left(dI_{dc} = 0, \frac{\partial I_{dc}}{\partial t} < 0\right)$$
$$= P_d^{old} (dI_{dc} \neq 0)$$

Here, "gpd" is the learning gain, "old" is the value of the parameter before the learning, and "new" is the value of the parameter after the learning.

Moreover, the adjustment amplitude "ad" is learned, for example, by using the vibrations or noise "dFrf" of the point of time when the time derivative of the current command correction signal "dIdc" becomes "0" as represented in the following expression, and the parameter "ad" for use in the current command value correcting unit 5 is optimized.

$$a_d^{new} = a_d^{old} + g_{ad} \times dF_{zf}\left(\frac{\partial dI_{dc}}{\partial t} = 0, dI_{dc} > 0\right)$$ [Expression 40]
$$= a_d^{old} - g_{ad} \times dF_{zf}\left(\frac{\partial dI_{dc}}{\partial t} = 0, dI_{dc} < 0\right)$$
$$= a_d^{old} \left(\frac{\partial dI_{dc}}{\partial t} \neq 0\right)$$

Here, "gad" is the learning gain.

As described above, in the sixth embodiment, the parameters "n", "ad", "pd", "aq", "pq" and the like of the motor parameter setting unit 63 are set so as to satisfy [Expression 38], and based on these parameters "n", "ad", "pd", "aq" and "pq", on the detection result of the electrical angle detecting unit 70, and on the like, the d-axis current command "Idco" outputted from the d-axis current instructing unit 61 and the q-axis current command "Iqco" outputted from the q-axis current instructing unit 62 are corrected. Then, the (6×n)f sine component, the (6×n)f cosine component, the (6×(n+1))f sine component, and the (6×(n+1))f cosine component, which are contained in the force "Fz" in the vibration direction, the force "Fz" being generated by the linear motor 69, are made zero. In addition, based on the ripple "dFrf" of the time when the time derivative of the current command correction signal "dIdc" created by the current command value correcting unit 64 becomes zero, the parameters "pd" and "ad" are adjusted by the correction parameter learning unit 73. Therefore, the 6×n and 6×(n+1) ripple components and the like can be suppressed, and the vibrations and noise of the linear motor 69 can be reduced to a large extent while reducing the torque ripple of the linear motor 69 to a large extent.

Note that, though the linear motor 69 is controlled in the sixth embodiment, a motor other than such a linear motor 69, for example, a motor in which exciting force perpendicular to the thrust is generated, for example, such as a disc motor, and the like may be controlled.

INDUSTRIAL APPLICABILITY

According to the present invention, the waveform of the output current supplied to the motor can be adjusted, and the torque ripple of the motor can be reduced to a large extent. As a result, the vibrations/noise of the motor can be reduced.

Moreover, the waveform of the output current supplied to the linear motor can be adjusted, and force variations in the Z-direction, which are generated in the linear motor, can be reduced to a large extent. As a result, the vibrations/noise of the linear motor can be reduced.

The invention claimed is:

1. A control device for a motor, comprising:
   a d-axis/q-axis current instructing unit creating a d-axis current command and q-axis current command in response to a deviation between an actually measured speed and preset rotation speed of the motor;
   a rotation angle detecting unit detecting a rotation of the motor and outputting an electrical angle of the motor;
   a motor parameter setting unit setting parameters corresponding to characteristics of the motor;
   a current command value correcting unit performing a correction necessary to suppress harmonic torque ripple components generated by the motor for the d-axis current command and q-axis current command outputted from the d-axis/q-axis current instructing unit in response to the electrical angle outputted from the rotation angle detecting unit and to the parameters outputted from the motor parameter setting unit, and creating a corrected d-axis current command value and corrected q-axis current command value;
   a current detecting unit detecting output currents of three phases, which are supplied to the motor, and outputting output current signals of the motor; and
   a 3-phase driving unit creating drive voltages of three phases and supplying the drive voltages to the motor based on the corrected d-axis current command value and corrected q-axis current command value outputted from the current command value correcting unit and on the output current detection signals of the motor outputted from the current detecting unit.

2. The control device according to claim 1, further comprising:
   a ripple detecting unit detecting vibrations or noise of the motor; and
   a correction parameter learning unit obtaining a parameter necessary to minimize the vibrations or noise of the motor based on a detection result of the ripple detecting unit and on the corrected d-axis current command value and corrected q-axis current command value created by the current command value correcting unit, and performing either processing for correcting the parameters for use in the current command value correcting unit or processing for notifying the obtained parameter from a notification device.

3. The control device according to claim 1, further comprising:
   a ripple assuming unit assuming a ripple of the motor based on the current command values created by the 3-phase driving unit, on the output current detection signal of the motor outputted from the current detecting unit, and on a rotation angle outputted from the rotation angle detecting unit; and
   a correction parameter learning unit obtaining a parameter necessary to minimize the vibrations or noise of the motor based on the corrected d-axis current command value and corrected q-axis current command value created by the current command value correcting unit and on an assumption result of the ripple detecting unit, and performing either processing for correcting the parameters for use in the current command value correcting unit or processing for notifying the obtained parameter from a notification device.

4. The control device according to claim 1, further comprising:
   a temperature detecting unit detecting a temperature of the motor; and
   a correction parameters changing unit obtaining a parameter necessary to minimize the vibrations or noise of the motor based on the temperature of the motor detected by the temperature detecting unit, and on the corrected d-axis current command value and corrected q-axis current command value, and performing either processing for changing the parameters for use in the current command value correcting unit or processing for notifying the obtained parameter from a notification device.

5. The control device according to claim 1, further comprising:
   an operation condition setting unit setting operation conditions; and
   a correction parameter switching unit switching the parameters of the current command correcting unit in response to the operation conditions set in the operation condition setting unit.

6. A control device for a linear motor, comprising:
   a d-axis/q-axis current instructing unit creating a d-axis current command and q-axis current command in response to a deviation between an actually measured speed and preset rotation speed of the linear motor;
   an electrical angle detecting unit detecting the speed of the linear motor and outputting an electrical angle of the motor;
   a motor parameter setting unit setting parameters corresponding to characteristics of the linear motor;
   a current command value correcting unit performing a correction necessary to suppress harmonic torque ripple components in a Z-direction generated by the linear motor for the d-axis current command and q-axis current command outputted from the d-axis/q-axis current instructing unit in response to the electrical angle outputted from the electrical angle detecting unit and to the parameters outputted from the motor parameter setting unit, and creating a corrected d-axis current command value and corrected q-axis current command value;
   a current detecting unit detecting 3-phase currents of the linear motor, and outputting output current signals of the linear motor;
   a 3-phase driving unit creating drive voltages of three phases and supplying the drive voltages to the linear motor based on the corrected d-axis current command value and corrected q-axis current command value outputted from the current command value correcting unit and on the output current detection signals of the linear motor outputted from current detecting unit;
   a ripple detecting unit detecting vibrations or noise of the linear motor; and
   a correction parameter learning unit obtaining a parameter necessary to minimize the vibrations or noise of the linear motor based on an output of the ripple detecting unit and on the corrected d-axis current command value and corrected q-axis current command value created by the current command value correcting unit, and performing either processing for correcting the parameters for use in the current command value correcting unit or processing for notifying the obtained parameter from a notification device.

* * * * *